US011420507B2

(12) United States Patent
Kuwahara et al.

(10) Patent No.: US 11,420,507 B2
(45) Date of Patent: Aug. 23, 2022

(54) POWER TRAIN SUPPORT STRUCTURE FOR VEHICLE

(71) Applicant: MAZDA MOTOR CORPORATION, Hiroshima (JP)

(72) Inventors: Wataru Kuwahara, Aki-gun (JP); Takashi Hamada, Aki-gun (JP); Yuuki Uchiba, Aki-gun (JP); Yuya Yamaoka, Aki-gun (JP); Yusuke Oki, Aki-gun (JP); Masaaki Kashimoto, Aki-gun (JP); Ryuichiro Amano, Aki-gun (JP); Yoshiaki Noguchi, Aki-gun (JP); Kazuki Kamimura, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 308 days.

(21) Appl. No.: 16/811,920

(22) Filed: Mar. 6, 2020

(65) Prior Publication Data

US 2020/0376946 A1  Dec. 3, 2020

(30) Foreign Application Priority Data

May 30, 2019  (JP) .............................. JP2019-100932
Aug. 1, 2019  (JP) .............................. JP2019-141908

(51) Int. Cl.
*B60K 1/00*  (2006.01)
*B62D 21/15*  (2006.01)
(Continued)

(52) U.S. Cl.
CPC .............. *B60K 1/00* (2013.01); *B62D 21/152* (2013.01); *B62D 25/082* (2013.01); *B60K 6/40* (2013.01);
(Continued)

(58) Field of Classification Search
CPC .......... B60K 1/00; B60K 6/40; B62D 25/082; B62D 25/14; B62D 25/20; B60Y 2200/91; B60Y 2200/92
See application file for complete search history.

(56) References Cited

U.S. PATENT DOCUMENTS 8,517,453 B2 *  8/2013  Yoshida ............... B62D 21/152
                                                 296/203.02
9,027,695 B2 *  5/2015  Nakamura ........... B62D 21/155
                                                 293/133
(Continued)

FOREIGN PATENT DOCUMENTS

CN        105980242 A     9/2016
CN        109747717 A     5/2019
(Continued)

OTHER PUBLICATIONS

The extended European search report issued by the European Patent Office dated Sep. 25, 2020, which corresponds to European Patent Application No. 20160682.9-1009 and is related to U.S. Appl. No. 16/811,920.
(Continued)

*Primary Examiner* — Jacob B Meyer
(74) *Attorney, Agent, or Firm* — Studebaker & Brackett PC

(57) ABSTRACT

A power train support structure includes a first front side frame disposed on one of left and right sides of a power train; a second front side frame disposed on the other of the left and right sides of the power train, and being greatly away from the power train with respect to the first front side frame; a mounting bracket having one of left and right ends connected to the power train; and a connecting member for connecting the mounting bracket and the second front side frame. The mounting bracket includes a front fixing portion and a rear fixing portion to be fixed to the power train. A
(Continued)

strength of the front fixing portion and the rear fixing portion is set to such a strength that the rear fixing portion is broken by a collision load from a front side, and the front fixing portion is not broken.

11 Claims, 19 Drawing Sheets

(51) Int. Cl.
 *B62D 25/08* (2006.01)
 *B60K 6/40* (2007.10)
 *B62D 25/14* (2006.01)
 *B62D 25/20* (2006.01)

(52) U.S. Cl.
 CPC ....... *B60Y 2200/91* (2013.01); *B60Y 2200/92* (2013.01); *B62D 25/14* (2013.01); *B62D 25/20* (2013.01)

(56) References Cited

U.S. PATENT DOCUMENTS

| | | | | |
|---|---|---|---|---|
| 9,061,713 | B2* | 6/2015 | Hashimoto | B60R 19/34 |
| 9,156,418 | B2* | 10/2015 | Ramoutar | B60R 19/24 |
| 9,950,603 | B2* | 4/2018 | Abe | B62D 21/11 |
| 10,703,416 | B2* | 7/2020 | Okura | B60K 1/04 |
| 10,899,214 | B2* | 1/2021 | Sloan | B60K 1/04 |
| 11,043,707 | B2* | 6/2021 | Sloan | H01M 10/6556 |
| 11,043,714 | B2* | 6/2021 | Sloan | H01M 50/20 |
| 2004/0195862 | A1* | 10/2004 | Saeki | B62D 21/152 |
| | | | | 296/187.09 |
| 2014/0183833 | A1* | 7/2014 | Takeshita | B62D 25/082 |
| | | | | 280/124.109 |
| 2014/0312637 | A1* | 10/2014 | Ramoutar | B60R 19/24 |
| | | | | 293/133 |
| 2014/0360798 | A1* | 12/2014 | Ghislieri | B62D 21/152 |
| | | | | 180/232 |
| 2014/0361560 | A1* | 12/2014 | Sakakibara | B62D 21/152 |
| | | | | 293/133 |
| 2015/0166108 | A1* | 6/2015 | Persson | B62D 25/088 |
| | | | | 296/187.09 |
| 2015/0246651 | A1* | 9/2015 | Muraji | B60R 19/24 |
| | | | | 296/187.1 |
| 2015/0375700 | A1* | 12/2015 | Ramoutar | B60R 19/24 |
| | | | | 293/155 |
| 2016/0176354 | A1* | 6/2016 | Ando | B60R 11/00 |
| | | | | 248/548 |
| 2016/0347374 | A1 | 12/2016 | Miyamoto et al. | |
| 2017/0113533 | A1* | 4/2017 | Abe | B60K 5/1241 |
| 2017/0129432 | A1* | 5/2017 | Daido | B62D 21/152 |
| 2019/0126983 | A1* | 5/2019 | Okura | B60K 1/04 |
| 2019/0126989 | A1* | 5/2019 | Okura | B60K 1/04 |
| 2020/0307698 | A1* | 10/2020 | Kawai | B62D 21/11 |

FOREIGN PATENT DOCUMENTS

| | | | | |
|---|---|---|---|---|
| EP | 2 810 854 A1 | 12/2014 | | |
| EP | 2810854 A1 * | 12/2014 | ............. | B62D 21/11 |
| EP | 3 483 040 A1 | 5/2019 | | |
| EP | 3483040 B1 * | 11/2020 | ............... | B60K 1/04 |
| GB | 2 329 877 A | 4/1999 | | |
| JP | 2007261529 A | 10/2007 | | |

OTHER PUBLICATIONS

An Office Action mailed by China National Intellectual Property Administration dated Mar. 2, 2022, which corresponds to Chinese Patent Application No. 202010100875.4 and is related to U.S. Appl. No. 16/811,920 with English language Summary.

* cited by examiner

POWER TRAIN SUPPORT STRUCTURE FOR VEHICLE

FIELD OF THE INVENTION

The present invention relates to a power train support structure for a vehicle.

DESCRIPTION OF RELATED ART

In a vehicle, generally, a space in front of a dashboard panel constituting a front wall of a passenger compartment is used as an accommodation room (a so-called engine room) for accommodating a power train including an engine or a motor, and the like. It is also general that a pair of left and right front side frames extending in the front-rear direction are disposed in the accommodation room, and the power train is supported by the paired left and right front side frames.

A power train is a rigid member. Therefore, it is required to suppress the power train from retracting toward a passenger within a passenger compartment (a driver on a driver seat and/or a passenger on a passenger seat) in the event of collision from the front side. Japanese Unexamined Patent Application Publication No. 2007-261529 discloses that, in a structure in which a mounting bracket for supporting a power train is mounted on a front side frame, the power train is allowed to fall downward by breaking the mounting bracket in the event of vehicular collision from the front side.

A power train to be accommodated within an accommodation room may be disposed to be offset to one of left and right sides (to one side in the vehicle width direction). In this case, the driver seat or the passenger seat is located substantially immediately behind the power train. On the other hand, in the event of collision from the front side, particularly, in the event of oblique collision in which a collision load is input obliquely from the front side to a position offset to the same side as the power train (to one of left and right sides) with respect to a center of the width of a front surface of a vehicle body, in other words, in the event of small overlap collision (hereinafter, referred to as SOL collision), it is highly likely that the power train may retract by receiving the collision load. In view of the above, how to protect a passenger from the power train that retracts in the event of oblique collision or SOL collision is a task.

SUMMARY OF THE INVENTION

In view of the above, an object of the present invention is to provide a power train support structure that enables to appropriately protect a passenger within a vehicle in which a power train is disposed to be offset to one of left and right sides.

In order to achieve the above object, the present invention is directed to a structure for supporting a power train disposed to be offset to one of left and right sides within an accommodation room formed in a vehicle front portion. The support structure includes: a first front side frame disposed on one of left and right sides of the power train; a second front side frame disposed on the other of the left and right sides of the power train, the second front side frame being greatly away from the power train with respect to the first front side frame; a mounting bracket extending in a left-right direction between the second front side frame and the power train, one of left and right ends of the mounting bracket being connected to the power train; and a connecting member for connecting the other of the left and right ends of the mounting bracket and the second front side frame. The mounting bracket includes a front fixing portion to be fixed to the power train, and a rear fixing portion to be fixed to the power train on a rear side with respect to the front fixing portion. When a collision load from a front side acts on the power train, a strength of each of the front fixing portion and the rear fixing portion is set to such a strength that the rear fixing portion is broken by the collision load and the front fixing portion is not broken in such a way that the power train in a plan view retracts, while performing yaw motion substantially around a predetermined portion of the connecting member.

DETAILED DESCRIPTION OF THE EMBODIMENT

In the following, preferred embodiments according to the present invention are described with reference to the drawings.

Figure 1:
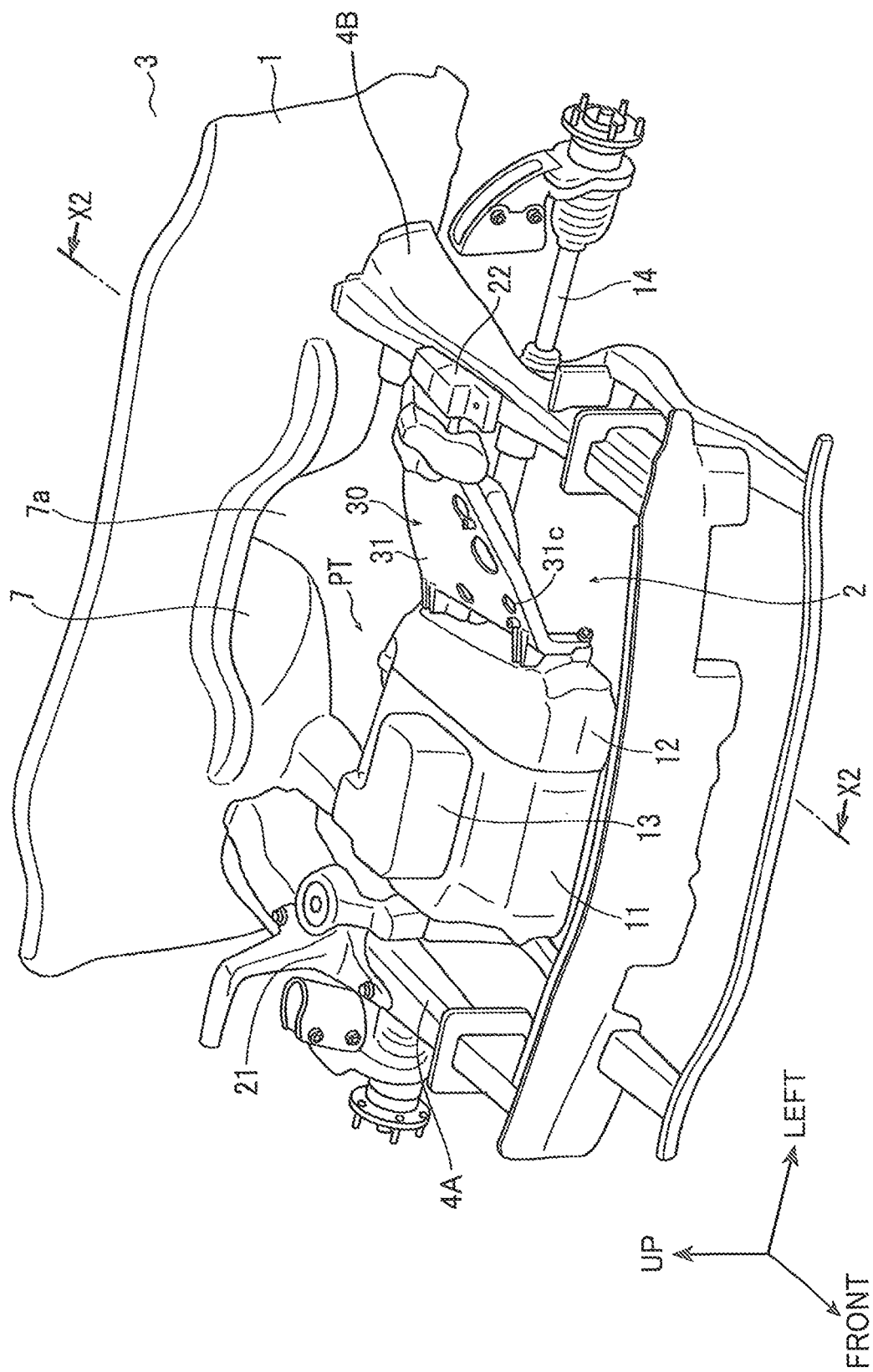
FIG. 1 illustrates a first embodiment according to the present invention, and is a perspective view illustrating how a power train is disposed within an accommodation room.
Figure 2:
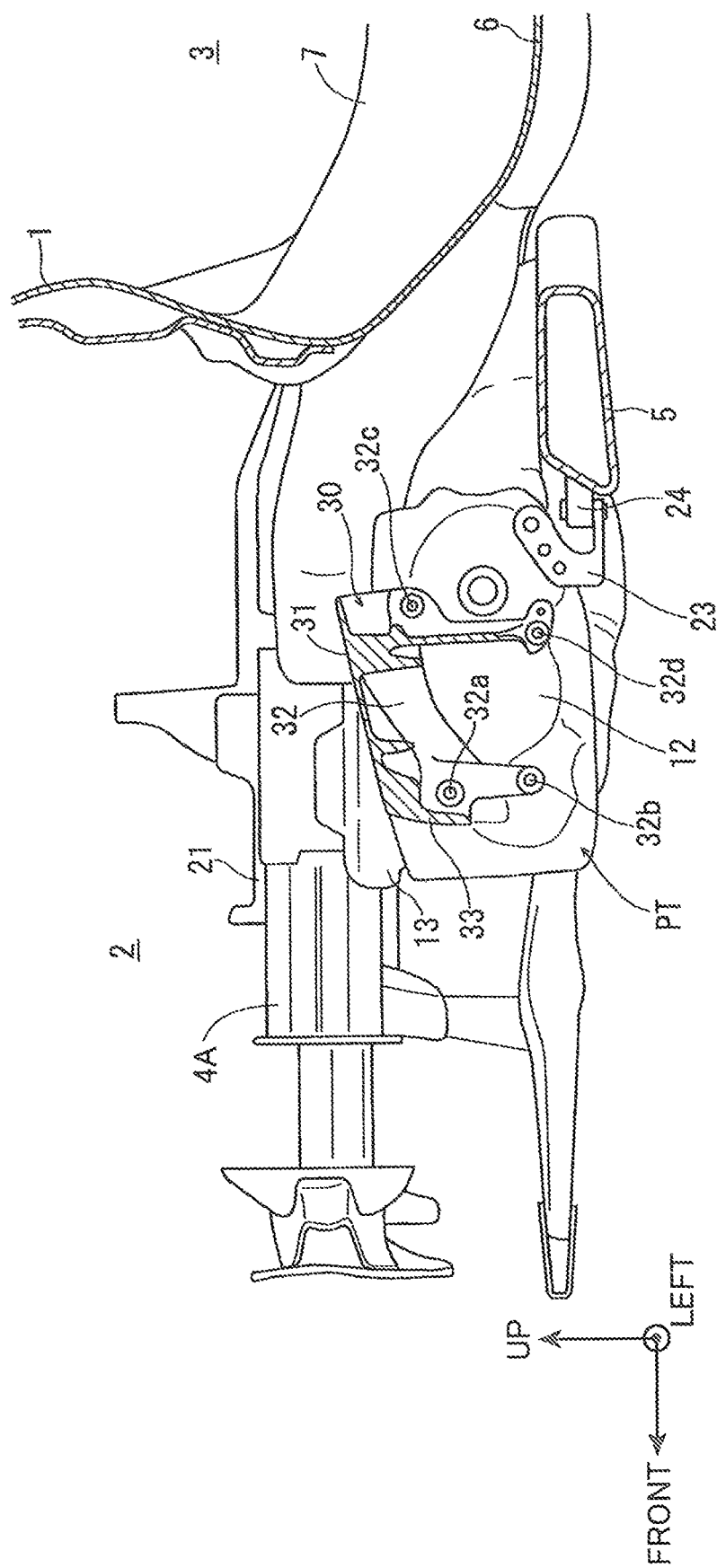
FIG. 2 is a cross-sectional view taken along the line X2-X2 in FIG. 1.
Figure 3:
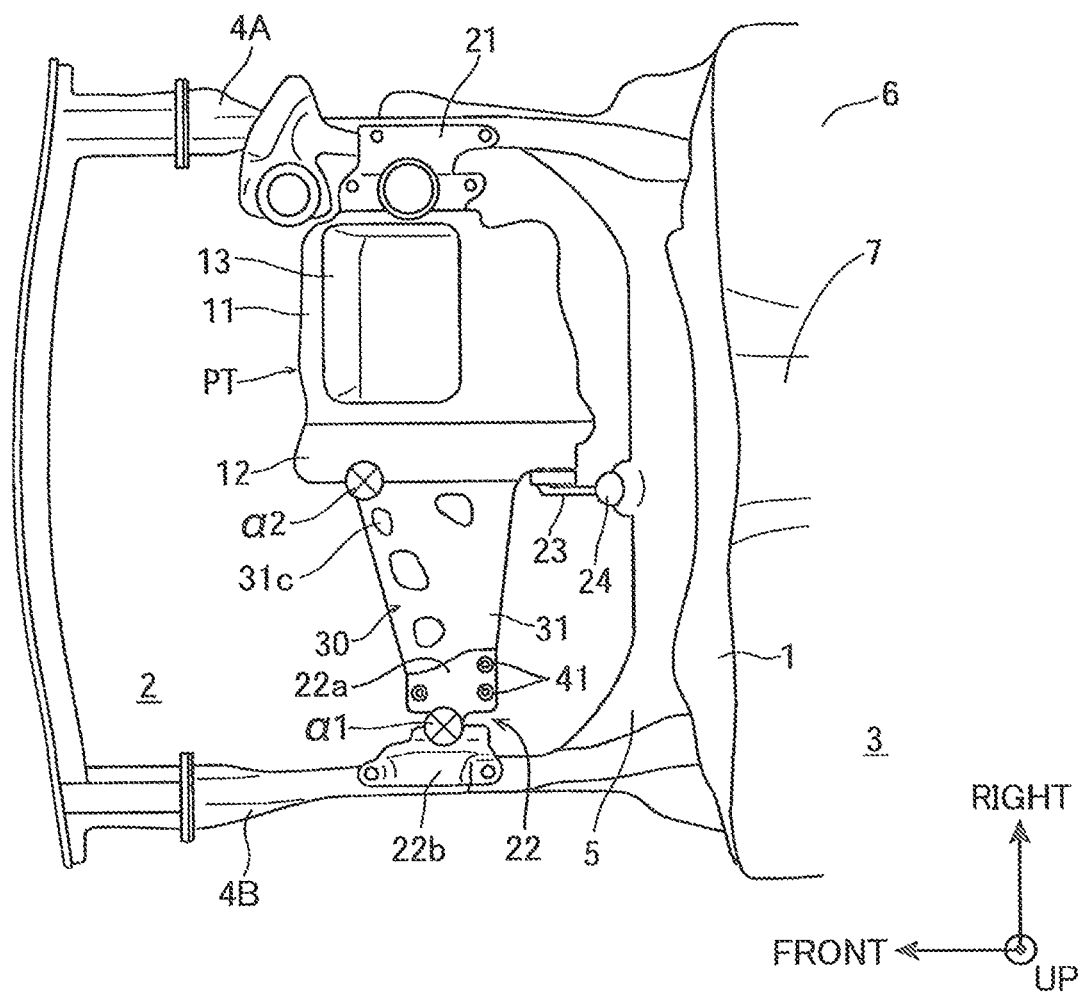
FIG. 3 is a plan view illustrating how the power train is disposed within the accommodation room.

FIGS. 1 to 3 are diagrams illustrating a schematic structure of a vehicle to which a power train support structure according to a first embodiment of the present invention is applied. The vehicle illustrated in FIGS. 1 to 3 is an electric vehicle in which only a motor is provided as a power source, and an engine (an internal combustion engine) is not provided.

Referring to FIGS. 1 to 3, an element indicated by the reference numeral 1 is a dashboard panel. An accommodation room 2 for accommodating a power train is formed in front of the dashboard panel 1, and a passenger compartment 3 is formed behind the dashboard panel 1. A pair of left and right front side frames 4A and 4B are disposed in the accommodation room 2. The paired left and right front side frames 4A and 4B are strengthening members, whose rear ends are connected to a pair of left and right side sills and floor frames via a torque box and the like.

A floor surface of the passenger compartment 3 is defined by a floor panel (see FIGS. 2 and 3). An upwardly bulging tunnel portion 7 is formed on an intermediate portion of the floor panel 6 in the left-right direction (in the vehicle width direction). The tunnel portion 7 extends in the front-rear direction along the floor panel 6, and includes a front end connected to a lower end of the dashboard panel 1. In other words, an opening portion 7a (see FIG. 1) opened in an intermediate portion of a lower end of the dashboard panel 1 in the left-right direction is formed in a front end of the tunnel portion 7.

In FIGS. 1 to 3, an element indicated by the reference sign PT is a power train. In the present embodiment, the power train PT is an electric power device including a motor 11, a transaxle 12, and an inverter 13. The power train PT as a whole is disposed within the accommodation room 2 in such a way that the power train PT is offset to one of left and right sides (in the present embodiment, to the vehicle right side). In other words, the power train PT is disposed in such a way that a center of the power train PT in the left-right direction is offset to one of left and right sides with respect to the vehicle width center.

The power train PT is disposed between the paired left and right front side frames 4A and 4B. Specifically, the front side frame 4A is disposed on the right side (on one of left and right sides) of the power train PT, and the front side frame 4B is disposed on the left side (on the other of the left and right sides) of the power train PT. In the present embodiment, since the power train PT is disposed to be offset to the right side, a distance in the left-right direction between the left front side frame 4B and the power train PT is larger than a distance in the left-right direction between the right front side frame 4A and the power train PT. The right front side frame 4A near the power train PT corresponds to a "first front side frame" in the present invention, and the left front side frame 4B far from the power train PT corresponds to a "second front side frame" in the present invention.

The motor 11 and the transaxle 12 are arranged in this order from the vehicle right side. In other words, the motor 11 is disposed to occupy an area including a right end of the power train PT, and the transaxle 12 is mounted on a left side surface of the motor 11. The inverter 13 is mounted on an upper surface of the motor 11.

A driving force generated in the motor 11 is transmitted to a pair of left and right driving shafts 14 (FIG. 1) via the transaxle 12. A front wheel (not illustrated) as a driving wheel is mounted on a distal end of each of the driving shafts 14. The inverter 13 adjusts electric power to be supplied to the motor 11 during driving of the vehicle. Further, during deceleration of the vehicle, the inverter 13 supplies, to a battery, electric power generated in the motor 11 functioning as a power generator (charges the battery).

The paired left and right front side frames 4A and 4B are connected to each other at a position behind the power train PT via a suspension support member 5, which extends in the left-right direction as a strengthening member.

The power train PT is supported on the vehicle body as follows. Specifically, a right end of the motor 11 is mounted on the right front side frame 4A via a mount member 21. A left end of the transaxle 12 is mounted on the left front side frame 4B via a mounting bracket 30 extending in the left-right direction, and a mounting member 22. The transaxle 12 is mounted on an intermediate portion of the suspension support member 5 in the left-right direction via a support bracket 23 and a mounting member 24. In this way, the power train PT is supported on the vehicle body at three positions in total, namely, at a left position, a right position, and a middle position. The left mounting member 22 corresponds to a "connecting member" in the present invention.

As illustrated in FIG. 3, the left mounting member 22 includes a first connecting portion 22a to be connected to the mounting bracket 30 (specifically, to an extension portion 31b to be described later), and a second connecting portion 22b to be connected to the left front side frame 4B. A waist portion in which a size in the front-right direction is reduced is formed between the first connecting portion 22a and the second connecting portion 22b. The waist portion of the mounting member 22 functions as a starting point of displacement of the power train PT, which displaces rearwardly in the event of vehicular collision from the front side. In the following, the waist portion is referred to as a displacement starting point cd. The displacement starting point cd corresponds to a "predetermined portion of a connecting member" in the present invention.

Next, details of the mounting bracket 30 are described with reference to FIGS. 6 to 13. The mounting bracket 30 includes a top wall 31, a vertical wall 32 extending substantially linearly and downwardly from an end of the top wall 31 on the transaxle 12 side (on the vehicle right side), a flange portion 33, and reinforcement ribs 34. A material of the mounting bracket 30 is not specifically limited, as far as the material has a strength necessary for supporting the power train PT. However, a metal material such as aluminum alloy may be used, for example.

The top wall 31 is formed into a plate shape having an upper surface of a relatively large area, and extends from the transaxle 12 to the vicinity of the left front side frame 4B. An upper surface of the top wall 31 is formed into an inclined flat shape in such a way that a height of the top wall 31 decreases toward the transaxle 12 (toward the right side). A plurality of opening portions 31a for reducing vibration (resonance) during driving are formed in the top wall 31. Further, a viewing hole 31c for allowing an operator to easily perform an operation of connecting the mounting bracket 30 to the power train PT, which will be described later, is formed in the top wall 31.

The top wall 31 includes an extension portion 31b, on a left end thereof, which is connected to the first connecting portion 22a (FIG. 3) of the mounting member 22 in an overlapping manner. The extension portion 31b is formed into a substantially trapezoidal shape in a plan view, which is associated with the shape of the first connecting portion 22a of the mounting member 22. The extension portion 31b includes a plurality of (in this example, three) fixing portions 31b1. An insertion hole h1 for passing a fastening bolt 41 (a connecting tool), which is illustrated in FIG. 3, is formed in each of the fixing portions 31b1. Specifically, the mounting bracket 30 and the mounting member 22 are connected to each other by fastening the fastening bolts 41 to the fixing portions 31b1 in a state that the extension portion 31b of the mounting bracket 30 and the first connecting portion 22a of the mounting member 22 overlap each other.

Figure 6:
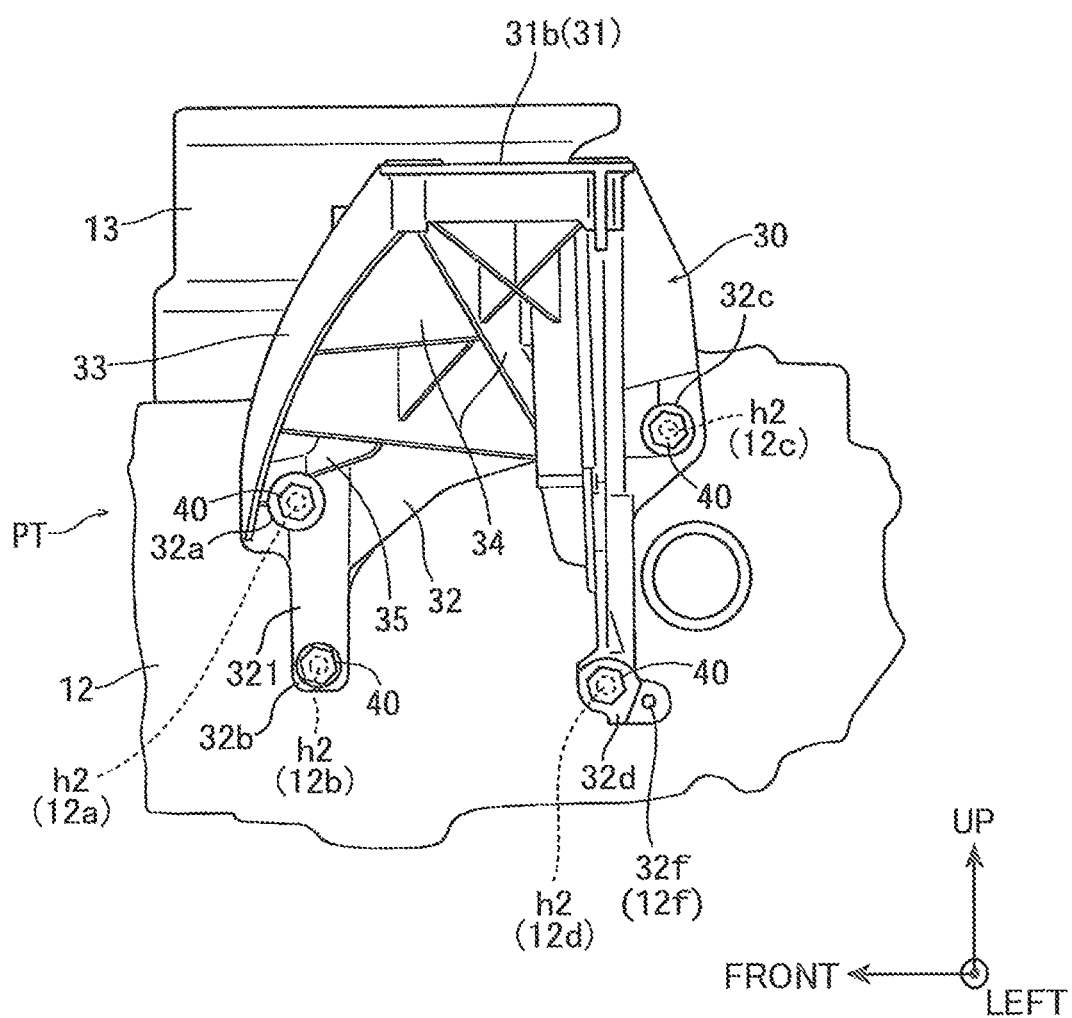
FIG. 6 is a side view illustrating a state that the mounting bracket is positioned with respect to the power train.
Figure 7:
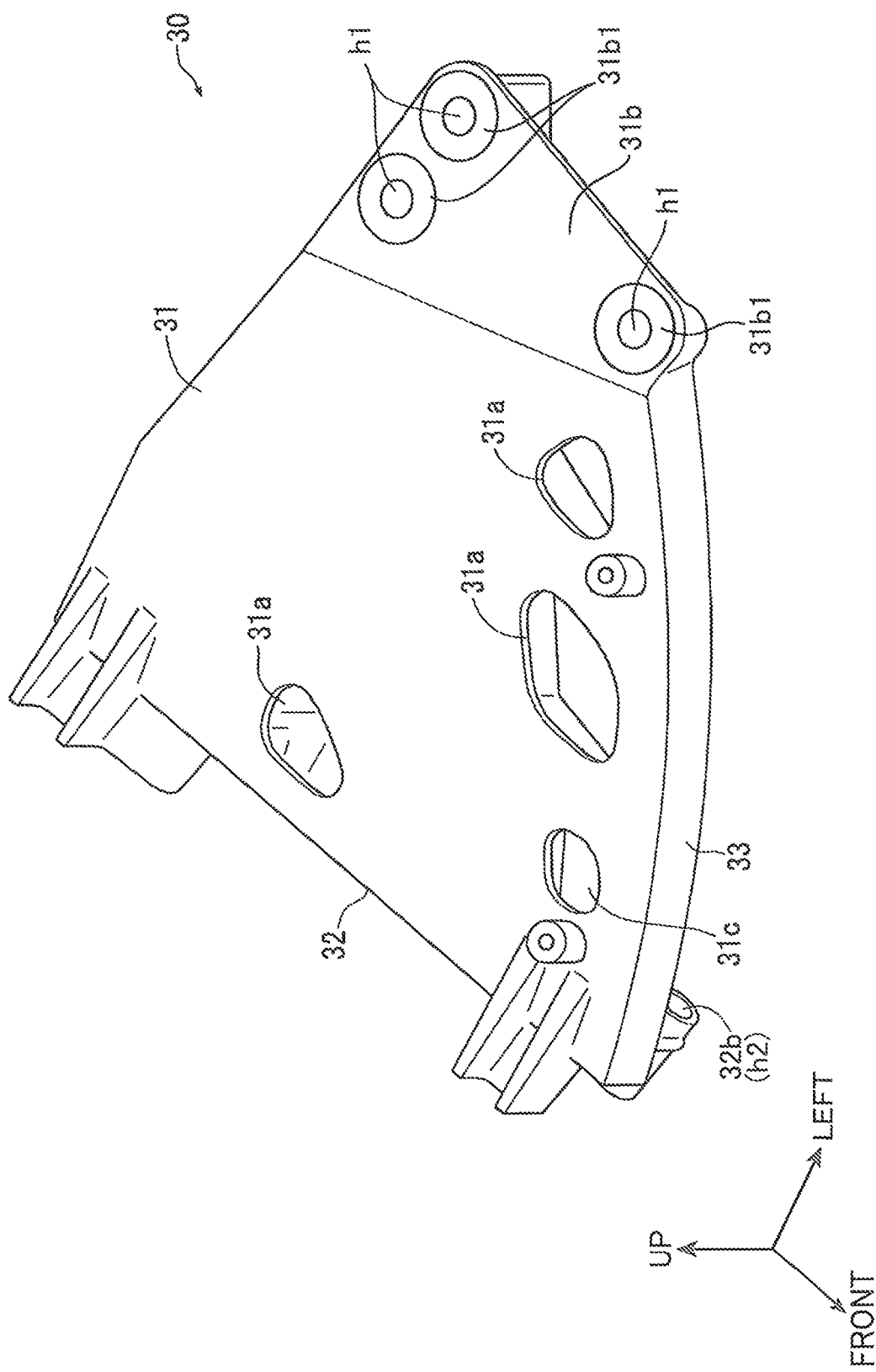
FIG. 7 is a perspective view of the mounting bracket.
Figure 8:
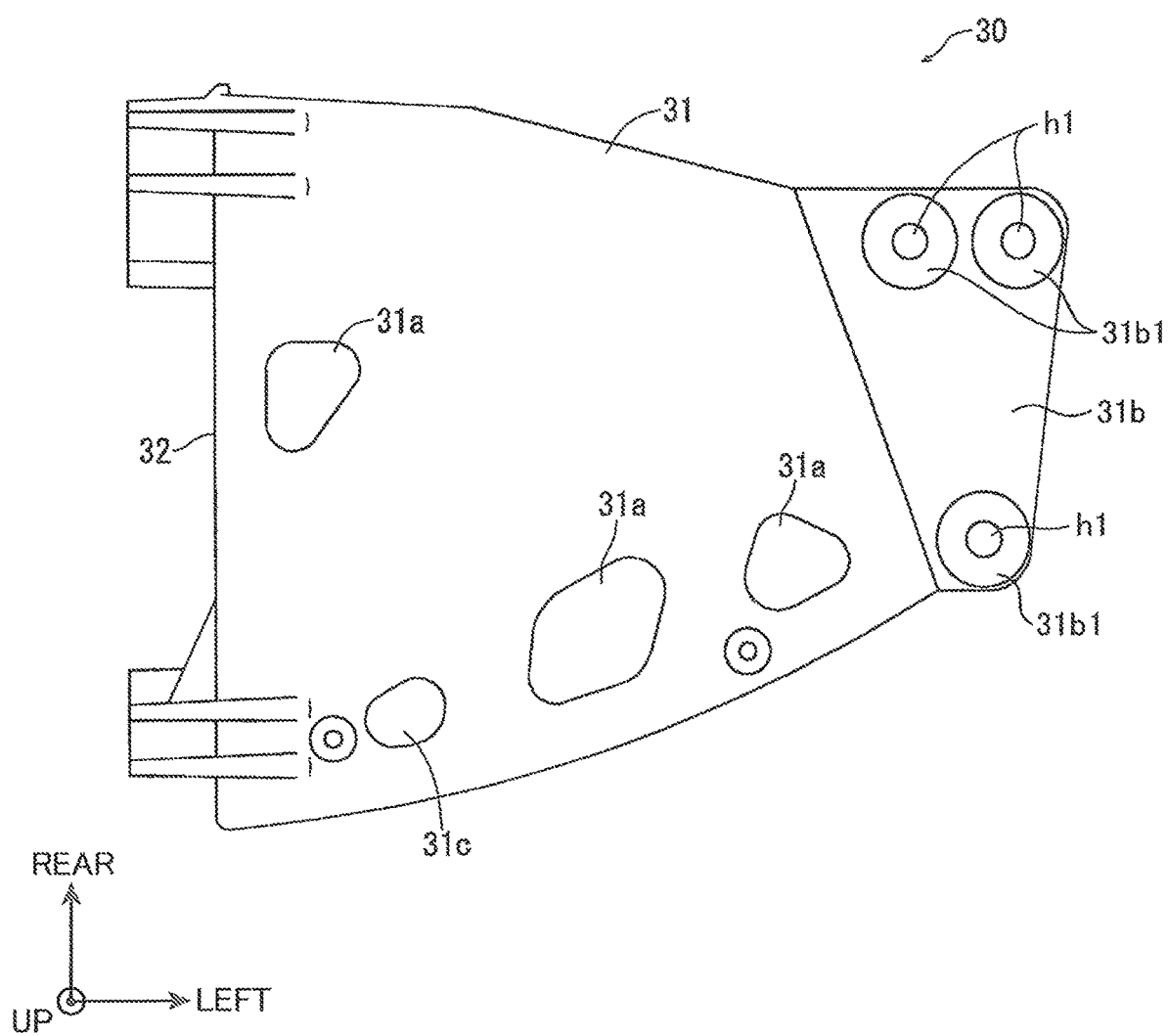
FIG. 8 is a plan view of the mounting bracket viewed from above.
Figure 9:
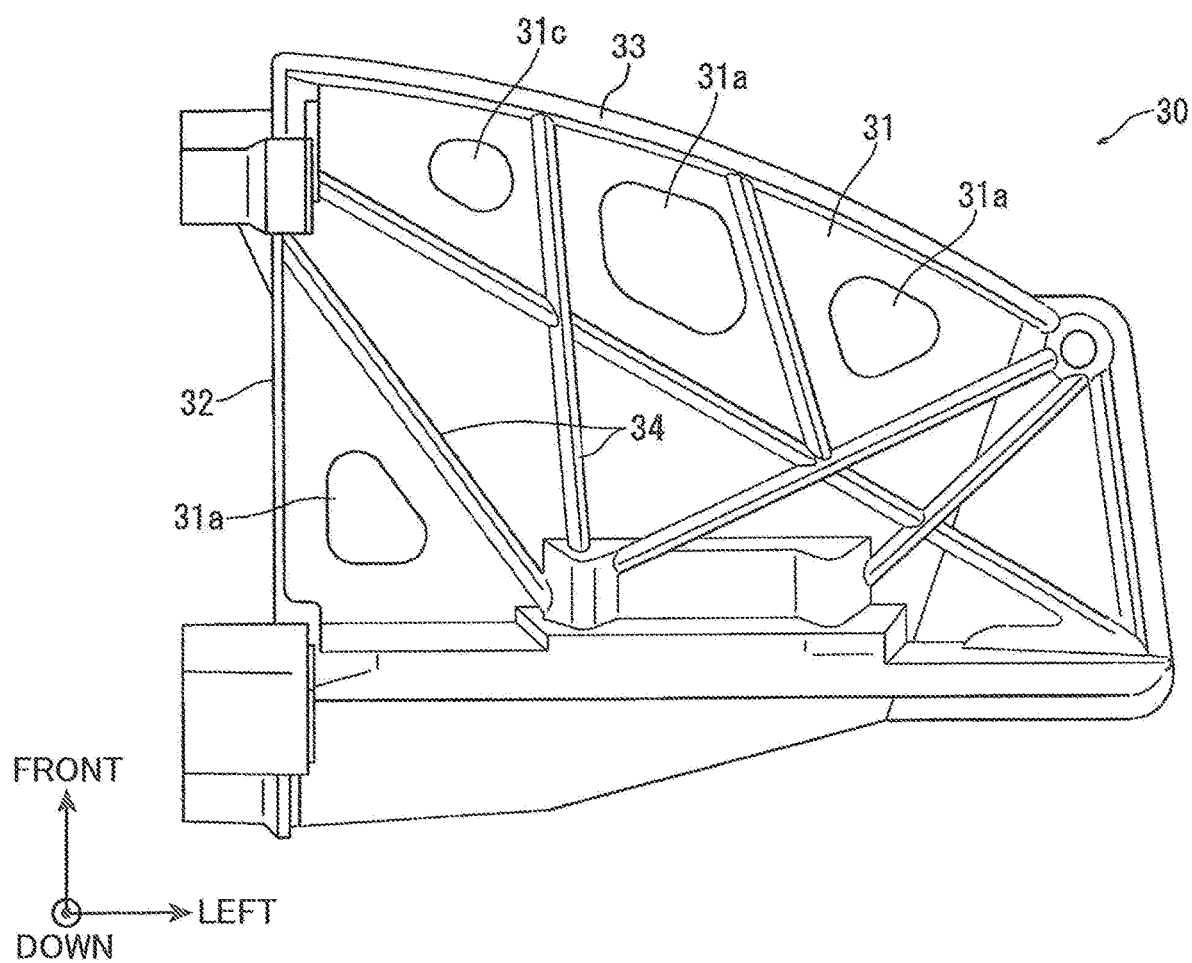
FIG. 9 is a bottom plan view of the mounting bracket viewed from below.
Figure 10:
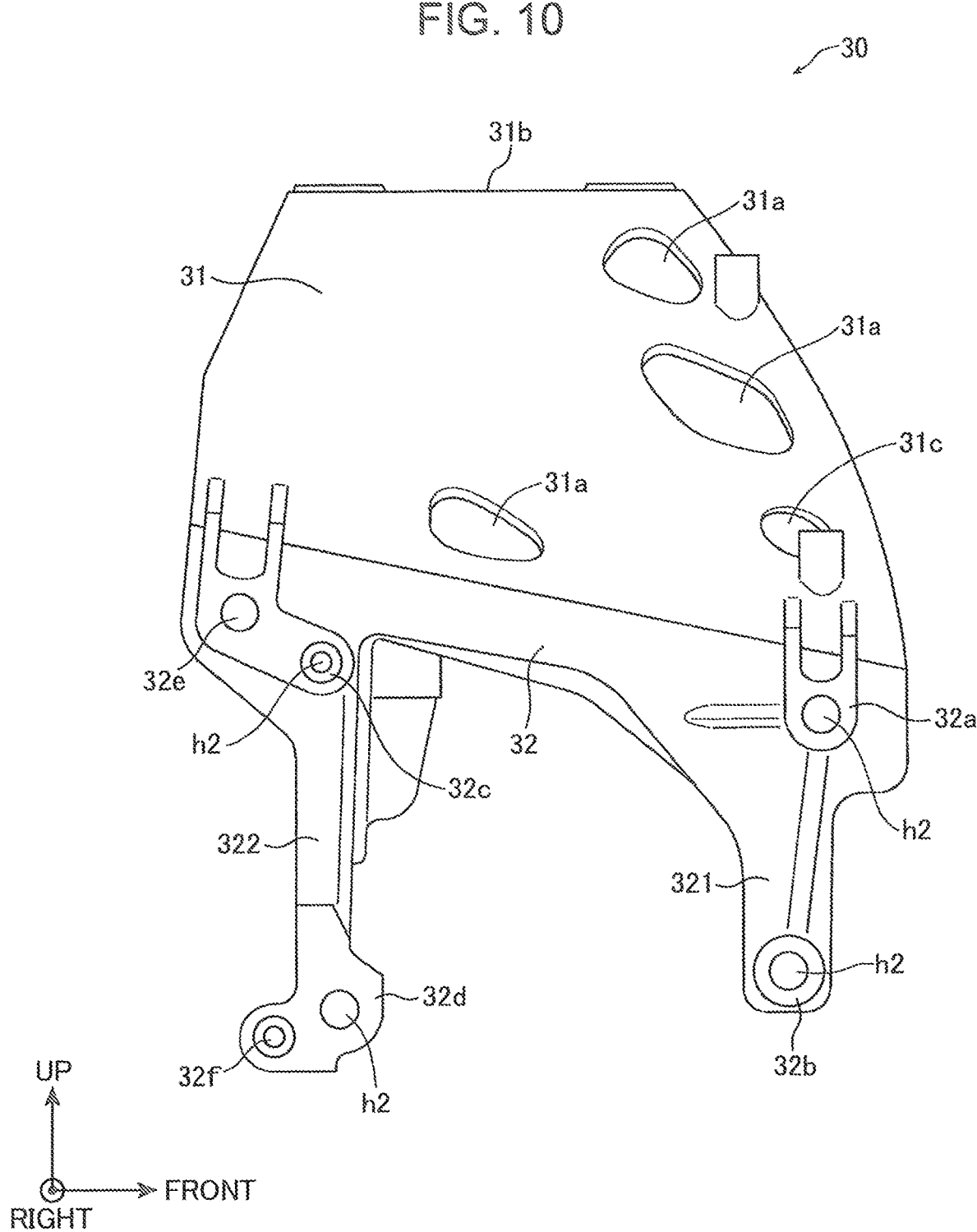
FIG. 10 is a side view of the mounting bracket viewed from the inner side in the vehicle width direction.
Figure 11:
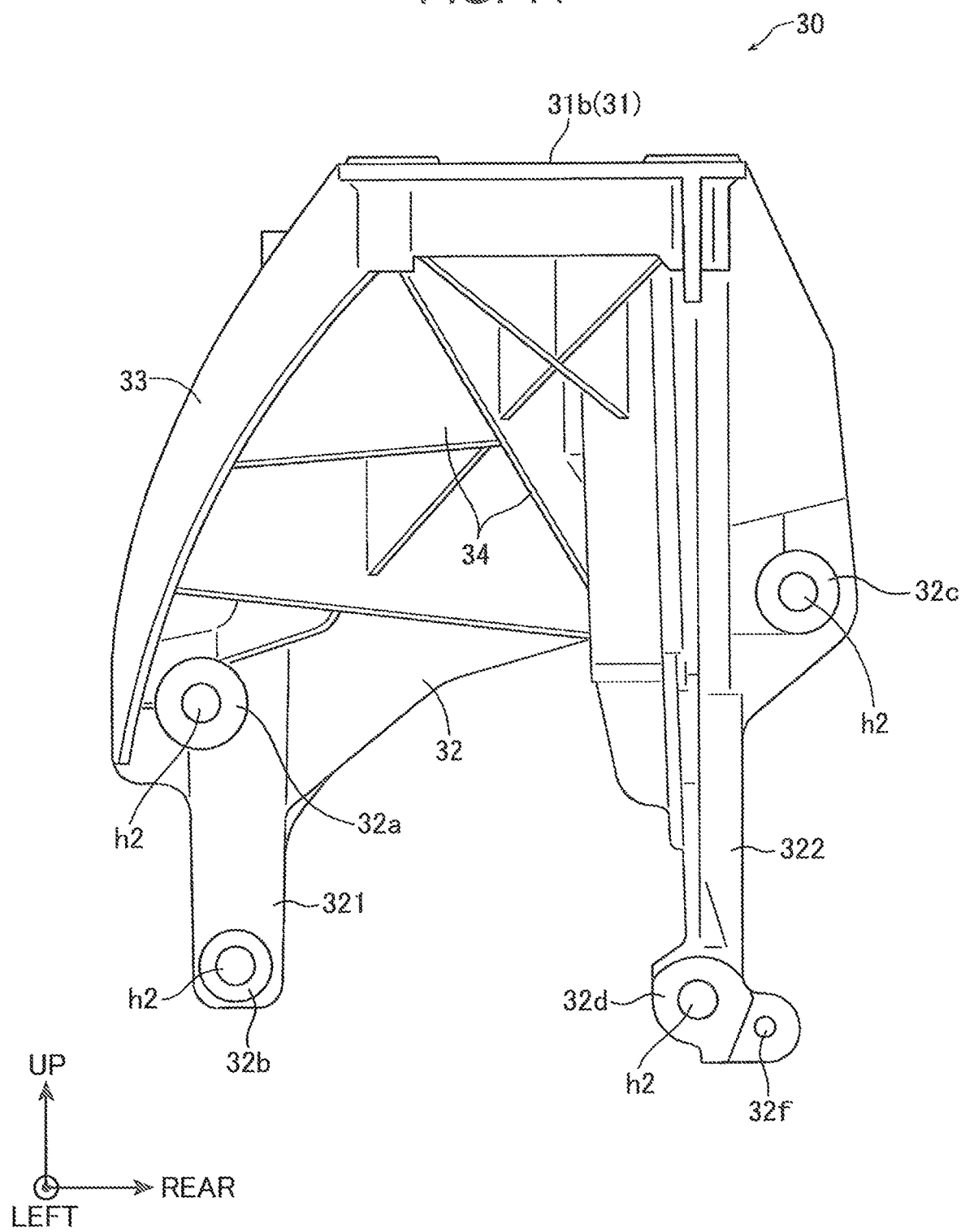
FIG. 11 is a side view of the mounting bracket viewed from the outer side in the vehicle width direction.
Figure 12:
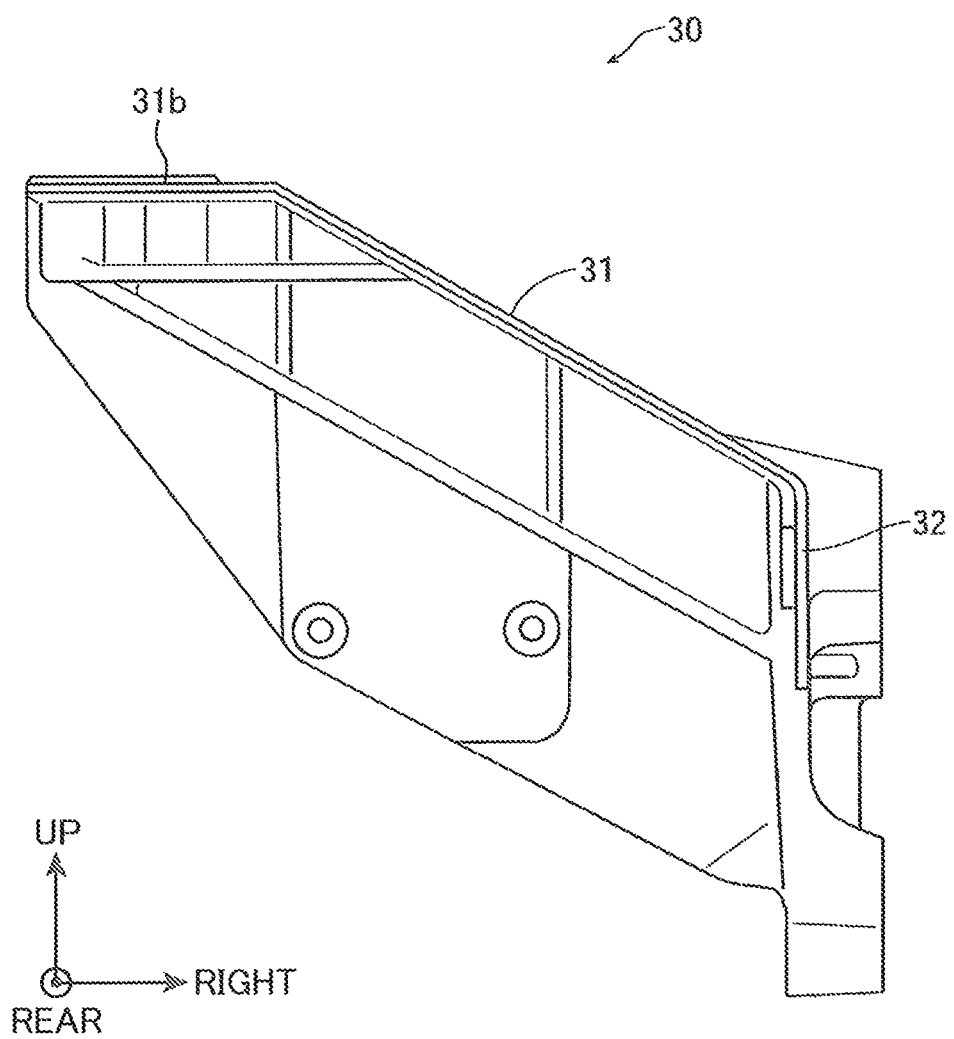
FIG. 12 is a rear view of the mounting bracket viewed from the rear side.
Figure 13:
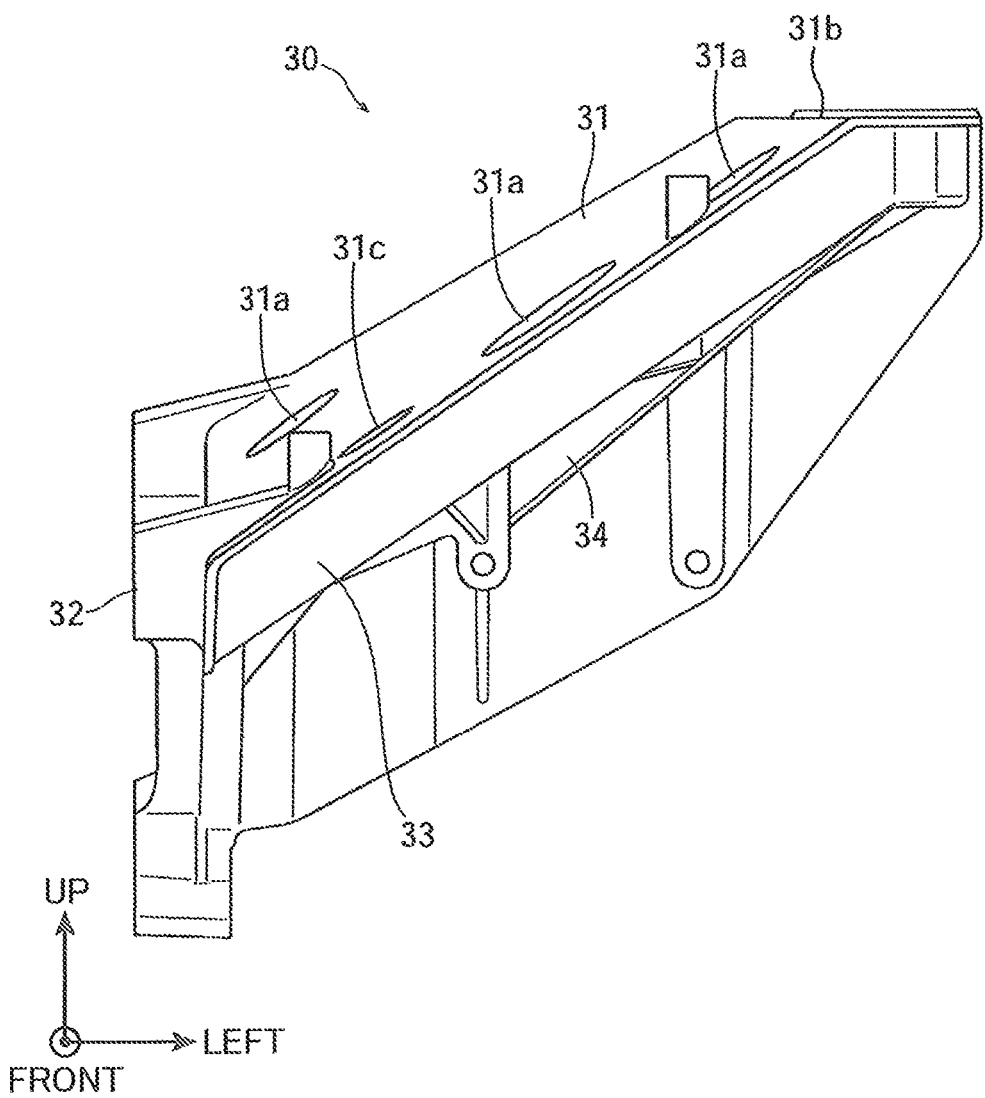
FIG. 13 is a front view of the mounting bracket viewed from the front side.

The vertical wall 32 functions as a mounting surface (a connecting surface) with respect to the power train PT (the transaxle 12). As illustrated in FIGS. 6, 10, 11, and the like, the vertical wall 32 includes a plurality of (in this example, four) fixing portions 32a to 32d to which fastening bolts 40 (connecting tools) are attached. An insertion hole h2 for passing the fastening bolt 40 is formed in each of the fixing portions 32a to 32d. Specifically, the mounting bracket 30 is fixed to the power train PT via the fastening bolts 40 to be fastened to the fixing portions 32a to 32d. In the following, the fixing portions 32a to 32d are respectively referred to as the first fixing portion 32a, the second fixing portion 32b, the third fixing portion 32c, and the fourth fixing portion 32d.

The first fixing portion 32a and the second fixing portion 32b are disposed on the front side with respect to the third fixing portion 32c and the fourth fixing portion 32d. Further, the first fixing portion 32a is disposed on the upper side with respect to the second fixing portion 32b, and the third fixing portion 32c is disposed on the upper side with respect to the fourth fixing portion 32d. The first fixing portion 32a corresponds to a "front fixing portion" in the present invention, and the second fixing portion 32b corresponds to a "lower fixing portion" in the present invention. Further, the third fixing portion 32c and the fourth fixing portion 32d correspond to a "rear fixing portion" in the present invention.

The vertical wall 32 includes downwardly extending two leg portions 321 and 322. The leg portion 321 is disposed on the front side with respect to the leg portion 322. The second fixing portion 32b is formed on a distal end (a lower end) of the front leg portion 321, and the fourth fixing portion 32d is formed on a distal end (a lower end) of the rear leg portion 322. Further, the first fixing portion 32a is formed near a base end of the front leg portion 321, and the third fixing portion 32c is formed near a base end of the rear leg portion 322.

The vertical wall 32 further includes positioning holes 32e and 32f (FIG. 10). The positioning holes 32e and 32f are holes for positioning the vertical wall 32 when being connected to the power train PT. The positioning hole 32e is formed near the base end of the rear leg portion 322 and in the vicinity of the third fixing portion 32c. The positioning hole 32f is formed in a distal end of the rear leg portion 322 and in the vicinity of the fourth fixing portion 32d.

The flange portion 33 extends downwardly by a short length from a front edge of the top wall 31. The flange portion 33 continues to a front end of the vertical wall 32. Forming the flange portion 33 enhances rigidity of the mounting bracket 30.

A large number of reinforcement ribs 34 are formed along a back surface of the top wall 31. Each end of a part of the reinforcement ribs 34 is connected to each of back surfaces (an inner surface) of the vertical wall 32 or the flange portion 33. The reinforcement ribs 34 play a role of enhancing rigidity of the mounting bracket 30 in cooperation with the flange portion 33.

The mounting bracket 30 is formed in such a way that a strength (rigidity) near the first fixing portion 32a particularly increases. Specifically, by employing at least one of a method of increasing the thickness of the vertical wall 32 near the first fixing portion 32a, and a method of disposing the reinforcement ribs 34 in such a way as to increase the strength near the first fixing portion 32a, the strength near the first fixing portion 32a increases, as compared with the strength near the other fixing portions 32b to 32d.

Figure 5:
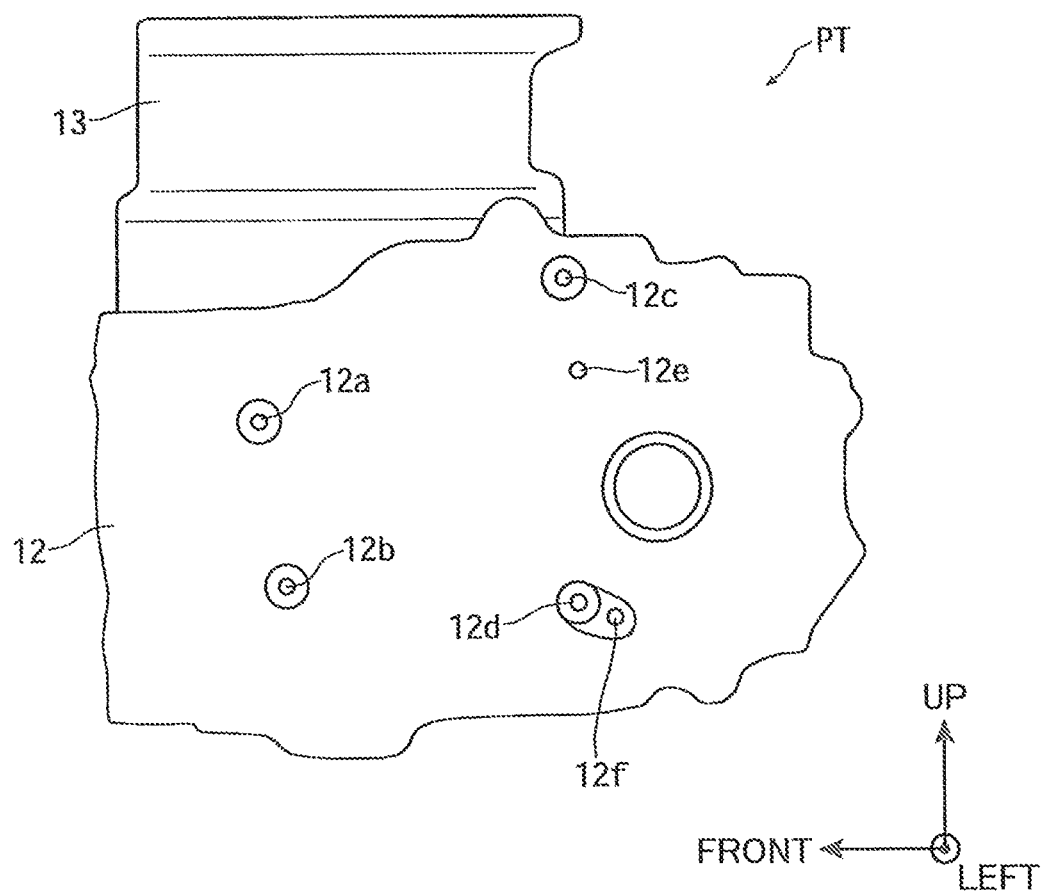
FIG. 5 is a side view illustrating one side surface of the power train including a mounting surface with respect to a mounting bracket.

Next, connection between the power train PT and the mounting bracket 30 is described. As illustrated in FIG. 5, mounting holes 12a to 12d constituted of screw holes are formed in a left side surface (an inner side surface in the vehicle width direction) of the transaxle 12 of the power train PT, in other words, in a mounting surface with respect to the mounting bracket 30, and two positioning pins 12e and 12f are mounted on the left side surface of the transaxle 12.

The positioning pins 12e and 12f mounted on the transaxle 12 are engaged in positioning holes 32e and 32f formed in the mounting bracket 30. By the engagement, positioning of the transaxle 12 and the mounting bracket 30 is performed.

The fastening bolts 40 are fastened to the first to fourth fixing portions 32a to 32d of the mounting bracket 30 in a state that the above positioning is performed. Specifically, by passing the fastening bolts 40 in the insertion holes h2 of the fixing portions 32a to 32d, and screwing the fastening bolts 40 in the mounting holes 12a to 12d of the transaxle 12, the mounting bracket 30 is connected to the power train PT (the transaxle 12) via the fastening bolts 40. In FIG. 2, illustration of the fastening bolts 40 is omitted in order to illustrate positions of the first to fourth fixing portions 32a to 32d.

When connection of the transaxle 12 and the mounting bracket 30 is performed, an operator P (FIG. 14) performs an operation of fastening the fastening bolts 40, while visually checking the positions of the first to fourth fixing portions 32a to 32d (the insertion holes h2) formed on the mounting bracket 30. In this case, particularly, the first fixing portion 32a as a front fixing portion is shielded by the top wall 31, the flange portion 33, and the reinforcement ribs 34 of the mounting bracket 30. Consequently, the first fixing portion 32a is less likely to be visually recognized from any direction, namely, from above, from the front side, and from the rear side. It is possible to visually check the position of the first fixing portion 32a from below. However, in this case, the operator P has to look up obliquely in a crouching posture. This is very inefficient in terms of operability. On the other hand, visually checking the other fixing portions 32b to 32d is relatively easy. For example, the operator P can basically view the other fixing portions 32b to 32d from above the mounting bracket 30 by looking down with his/her head tilted a little, while standing.

The viewing hole 31c is formed in the top wall 31 of the mounting bracket 30 in order to aid the operator to view the first fixing portion 32a, which is shielded by the various elements of the mounting bracket 30 as described above. Specifically, the viewing hole 31c is formed in a specific part of the top wall 31 associated with the first fixing portion 32a in such a way that the operator can view the first fixing portion 32a (and the insertion hole h2 thereof) from above through the viewing hole 31c. More specifically, the viewing hole 31c is formed in a front right end of the top wall 31 (in an inner portion in the vehicle width direction of a front end of the top wall 31). Further, as illustrated in a bottom plan view of FIG. 9, the viewing hole 31c is formed in an area surrounded by the flange portion 33 and the reinforcement ribs 34.

Figure 14:
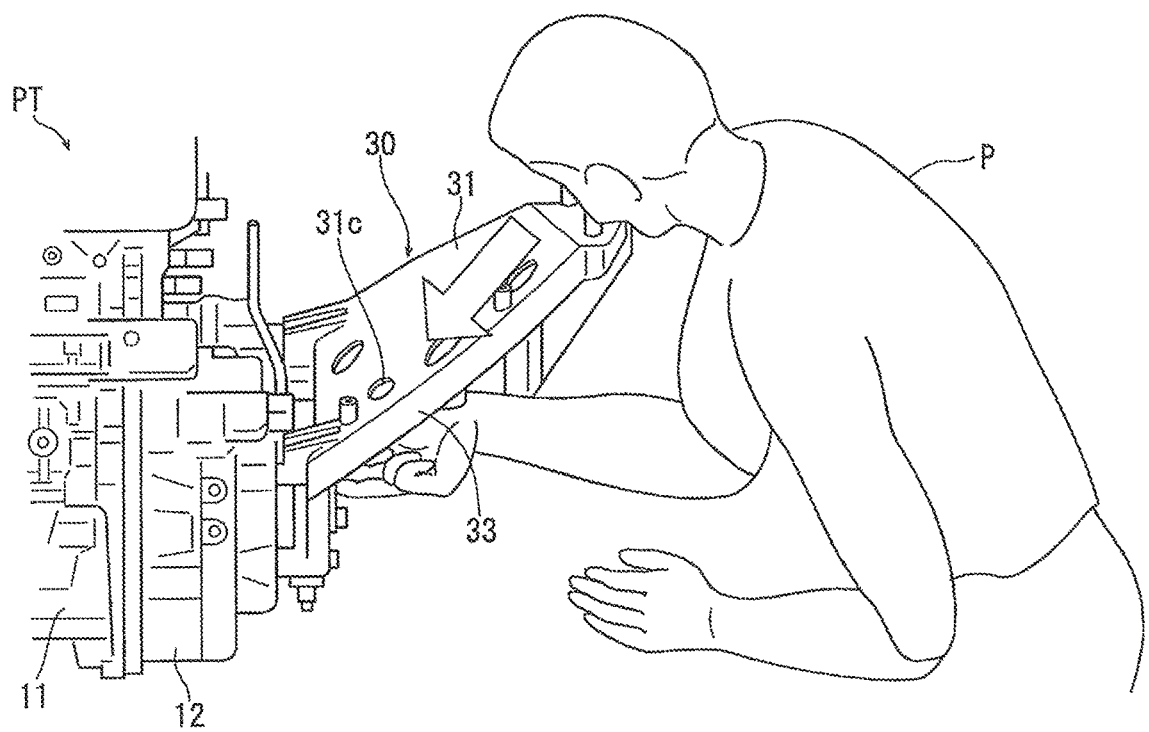
FIG. 14 is a diagram illustrating an operation of fixing the mounting bracket to the power train.
Figure 15:
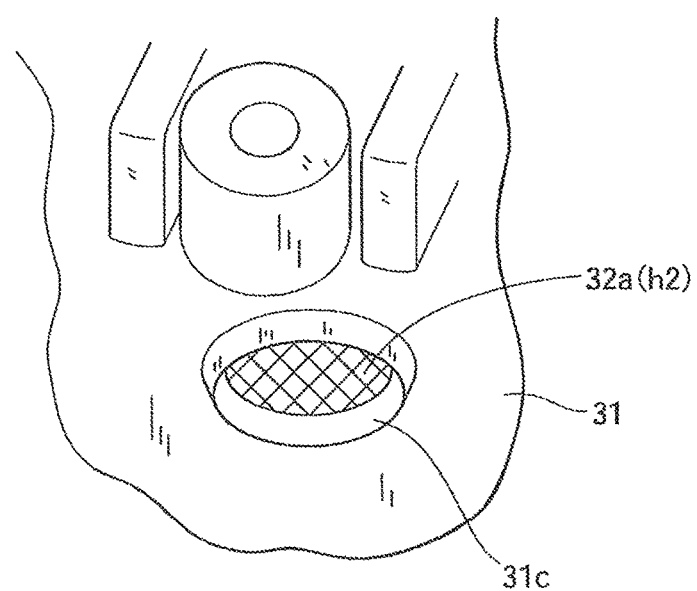
FIG. 15 is an enlarged view of essential parts illustrating that a first fixing portion can be viewed from above the mounting bracket.

As illustrated in FIG. 14, the operator P can view the first fixing portion 32a through the viewing hole 31c from above the mounting bracket 30. FIG. 15 illustrates a state that the operator P is viewing the insertion hole h2 of the first fixing portion 32a through the viewing hole 31c. In FIG. 15, the first fixing portion 32a (the insertion hole h2) to be viewed is indicated by a hatched portion. As illustrated in FIG. 15, the operator P can easily perform an operation of fastening the fastening bolt 40 with respect to the first fixing portion 32a, in other words, an operation of inserting the fastening bolt 40 into the insertion hole h2 of the first fixing portion 32a and screwing the fastening bolt 40 in the mounting hole 12a.

Further, during maintenance and the like of the vehicle, connection of the power train PT and the mounting bracket 30 by the fastening bolts 40 may be disconnected. The operator can perform the disconnecting operation, while visually recognizing the fastening bolt 40 associated with the first fixing portion 32a through the viewing hole 31c.

An assembly of the power train PT and the mounting bracket 30 connected by the fastening bolts 40 is, thereafter, mounted on the paired left and right front side frames 4A and 4B. Fixation by the fastening bolts 40 is preferably performed by performing provisional fixation in a state before the assembly of the power train PT and the mounting bracket 30 is installed on the front side frames 4A and 4B, and performing final fixation after the assembly is installed on the front side frames 4A and 4B.

In a plan view of FIG. 3, as already described, the reference sign α1 indicates the displacement starting point of the left mounting member 22. Further, the reference sign α2 indicates a connecting portion between the first fixing portion 32a of the mounting bracket 30, and the transaxle 12. The displacement starting point α1 and the connecting portion α2 are portions that are greatly related to movement of the power train PT in the event of collision from the front side.

Figure 4:
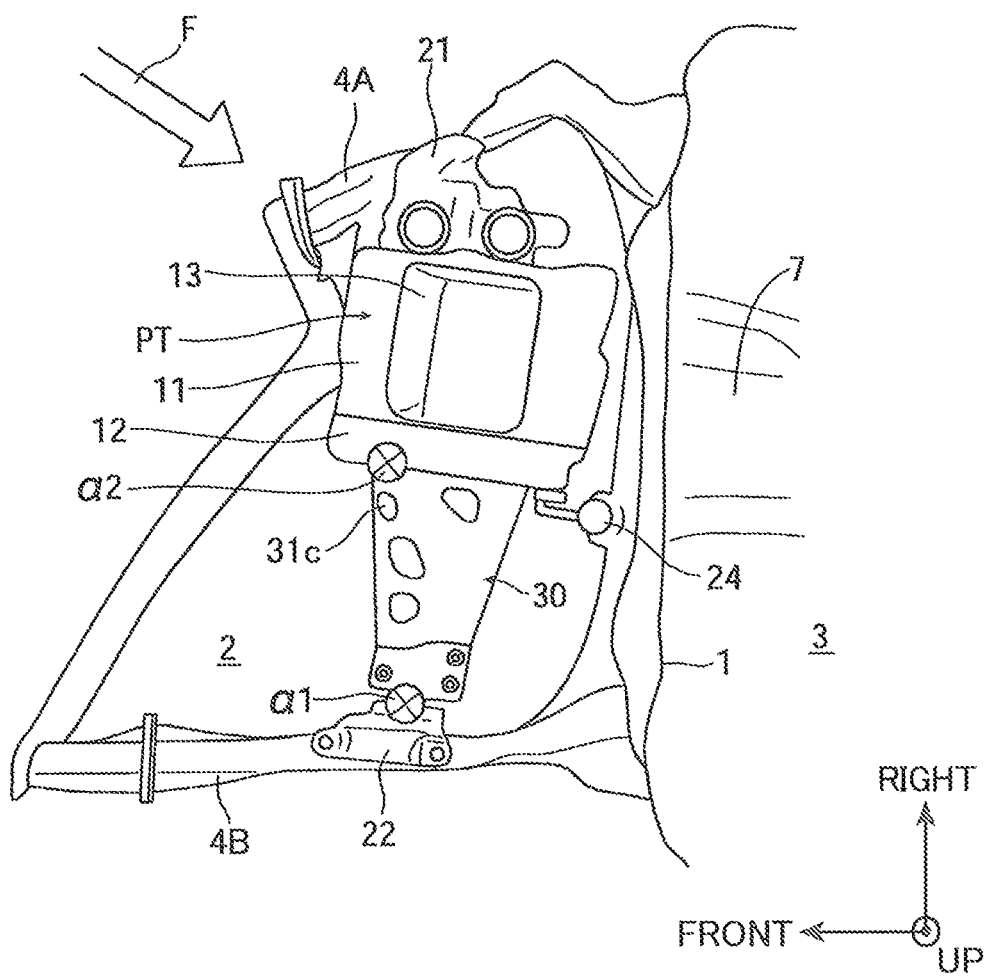
FIG. 4 is a plan view illustrating how a collision load acts obliquely from the front side in the event of oblique collision.

Let us assume a case that vehicular collision from the front side, more specifically, oblique collision (or SOL collision), in which a collision load is input obliquely from the front right side to a position offset to the right side (to the same side as the power train PT) with respect to a center of the width of the front surface of the vehicle body, has occurred. In FIG. 4, the reference sign F indicates a collision load, which is supposed to be input obliquely from the front right side in the event of such oblique collision.

When the collision load F is input to the power train PT, the second to fourth fixing portions 32b to 32d having a relatively small strength among the connecting portions (fixing portions) of the mounting bracket 30 with respect to the transaxle 12 are broken at an early stage, and a state that the transaxle 12 and the mounting bracket 30 are connected only by the fixing portion 32a on the upper front side is acquired. Then, a reaction force (a pushing force) of the mounting bracket 30 against the power train PT mainly acts from a front portion (the connecting portion α2) of the mounting bracket 30, which corresponds to the first fixing portion 32a. Thus, in a plan view of FIG. 4, the power train PT retracts, while performing yaw motion around the vicinity of the displacement starting point α1 of the mounting member 22.

When yaw motion as described above is generated in the event of collision from the front side, the power train PT as a whole retracts, while displacing toward the vehicle width center, and is guided to a position between the driver seat and the passenger seat. In other words, the yaw motion plays a role of preventing or suppressing the power train PT from linearly retracting (moving toward the driver seat or the passenger seat).

Further, in addition to retraction accompanying the yaw motion as described above, the power train PT displaces downwardly. As described above, in the present embodiment, the top wall 31 of the mounting bracket 30 is inclined in such a way that a height of the top wall 31 decreases toward the power train PT (toward the right side). The above-described shape of the mounting bracket 30 is preferable in terms of displacing the power train PT downwardly in the event of collision from the front side.

Displacing the power train PT in the above-described direction in the event of collision from the front side means that the power train PT moves toward the opening portion 7a in the front end of the tunnel portion 7, which is located in the middle of the lower end of the dashboard panel 1. Therefore, even when a retraction amount of the power train PT is considerably large, the power train PT including the inverter 13, which is located at a relatively high position, moves in such a way as to enter the opening portion 7a. This prevents or suppresses the power train PT from entering the passenger compartment 3.

FIG. 4 assumes a case that the collision load F is input obliquely from the front right side to a right portion of the front surface of the vehicle body. The above-described displacement of the power train PT (a displacement toward the opening portion 7a formed in the front end of the tunnel portion 7) is also observed in a case that a collision load is input linearly from the front side to the right portion of the front surface of the vehicle body (a position immediately in front of the power train PT).

The vehicle body of the vehicle according to the present embodiment has a structure sharable between an electric vehicle without an engine, and a range extended electric vehicle including an engine exclusively used for power generation. However, in the case of a range extended electric vehicle, the mounting bracket 30 is not provided.

Figure 16:
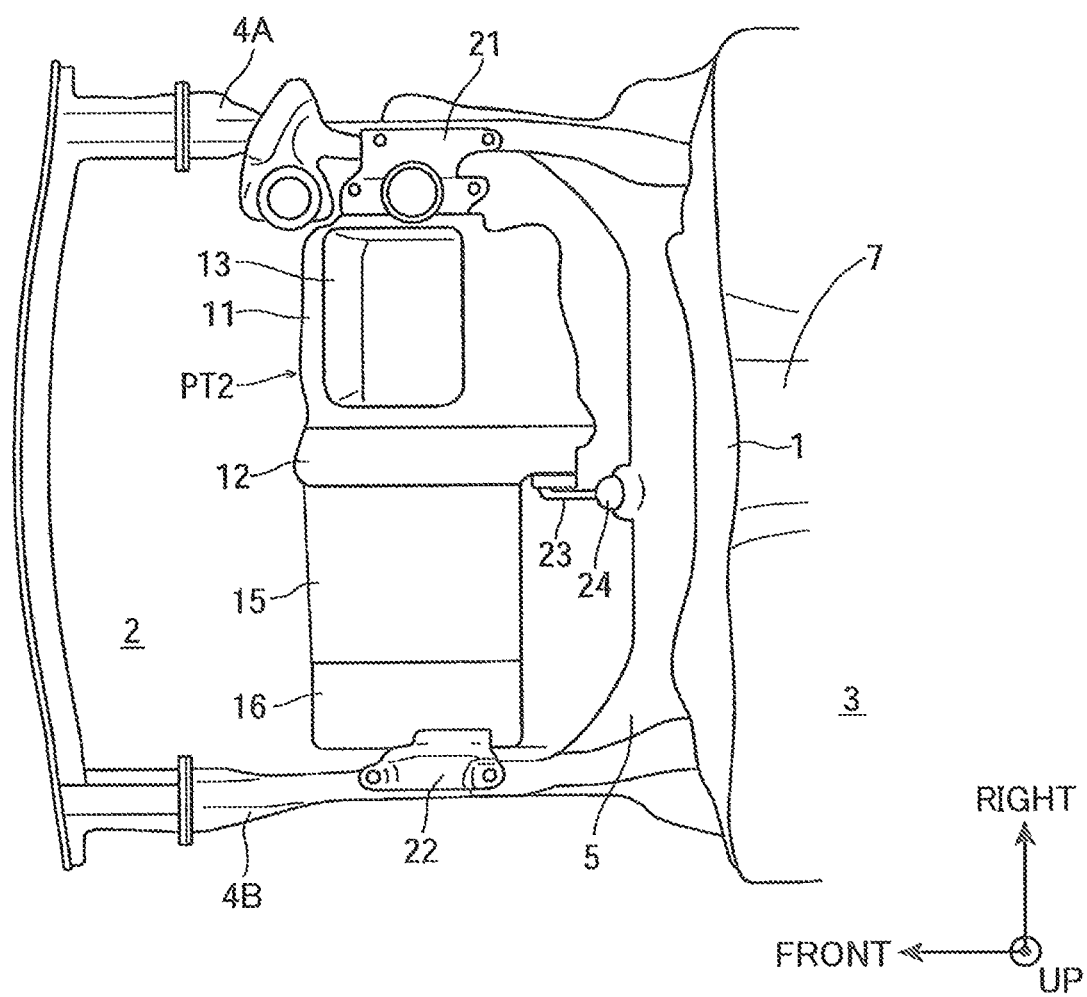
FIG. 16 illustrates an example in which the power train including an engine and a power generator is mounted in a vehicle, and is a plan view corresponding to FIG. 3.

FIG. 16 illustrates an installation example of a power train PT 2 for use in a range extended electric vehicle. In the example of FIG. 16, in place of a mounting bracket 30, an engine 15, and a power generator 16 to be powered by the engine 15 are disposed between a transaxle 12 and a mounting member 22. Specifically, the power train PT2 has a structure in which a motor 11, the transaxle 12, the engine 15, and the power generator 16 are connected in series.

Figure 17:
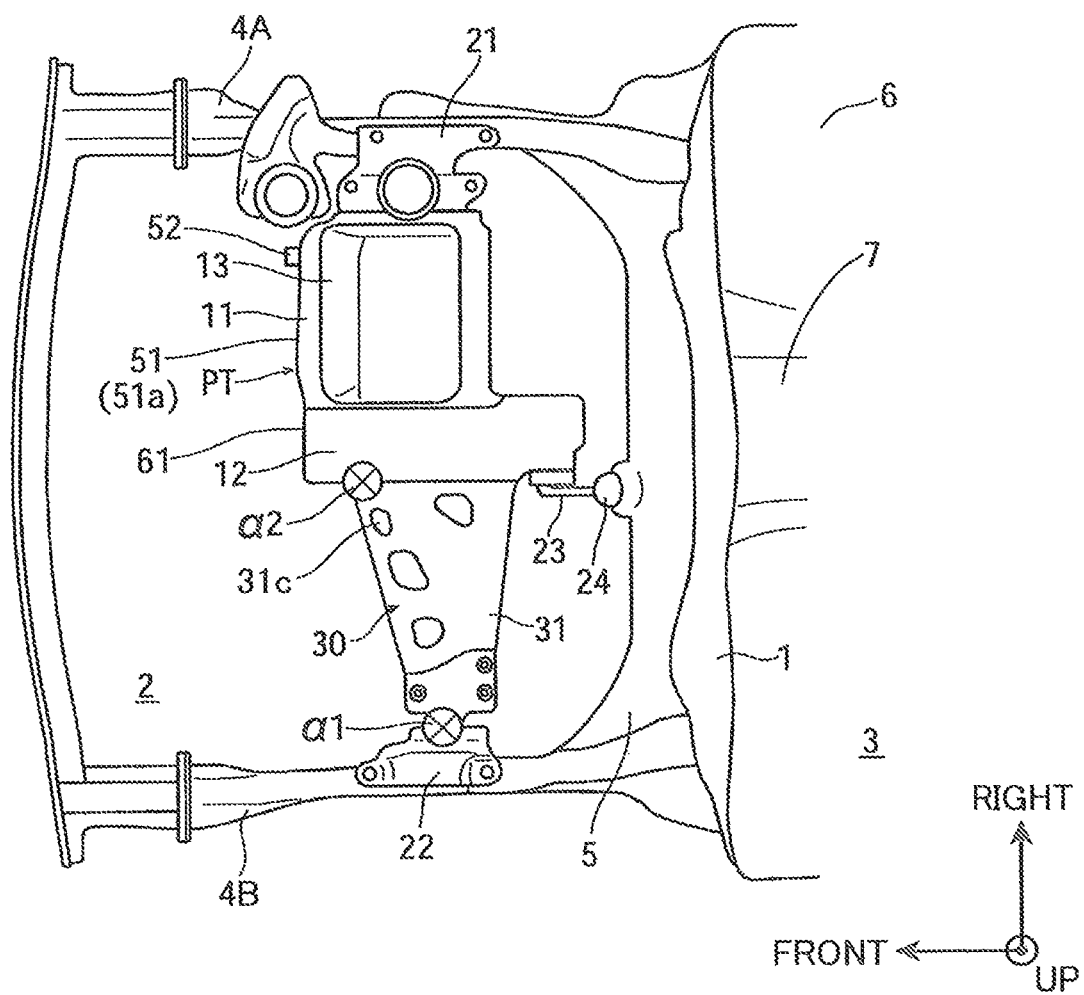
FIG. 17 illustrates a second embodiment according to the present invention, and is a plan view corresponding to FIG. 3.
Figure 18:
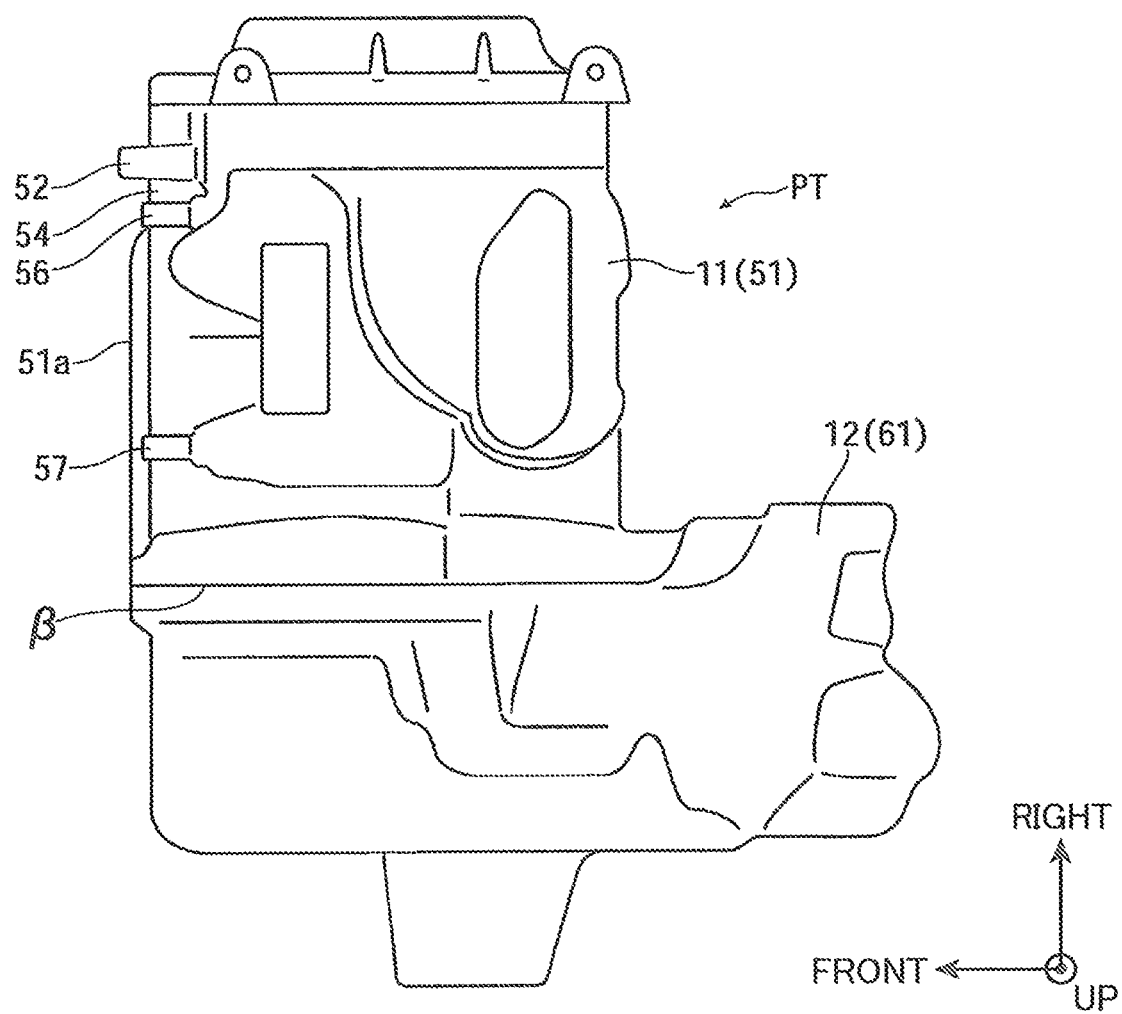
FIG. 18 is a plan view of combination of a motor and a trans axle included in a power train in FIG. 17, when viewed from above.
Figure 19:
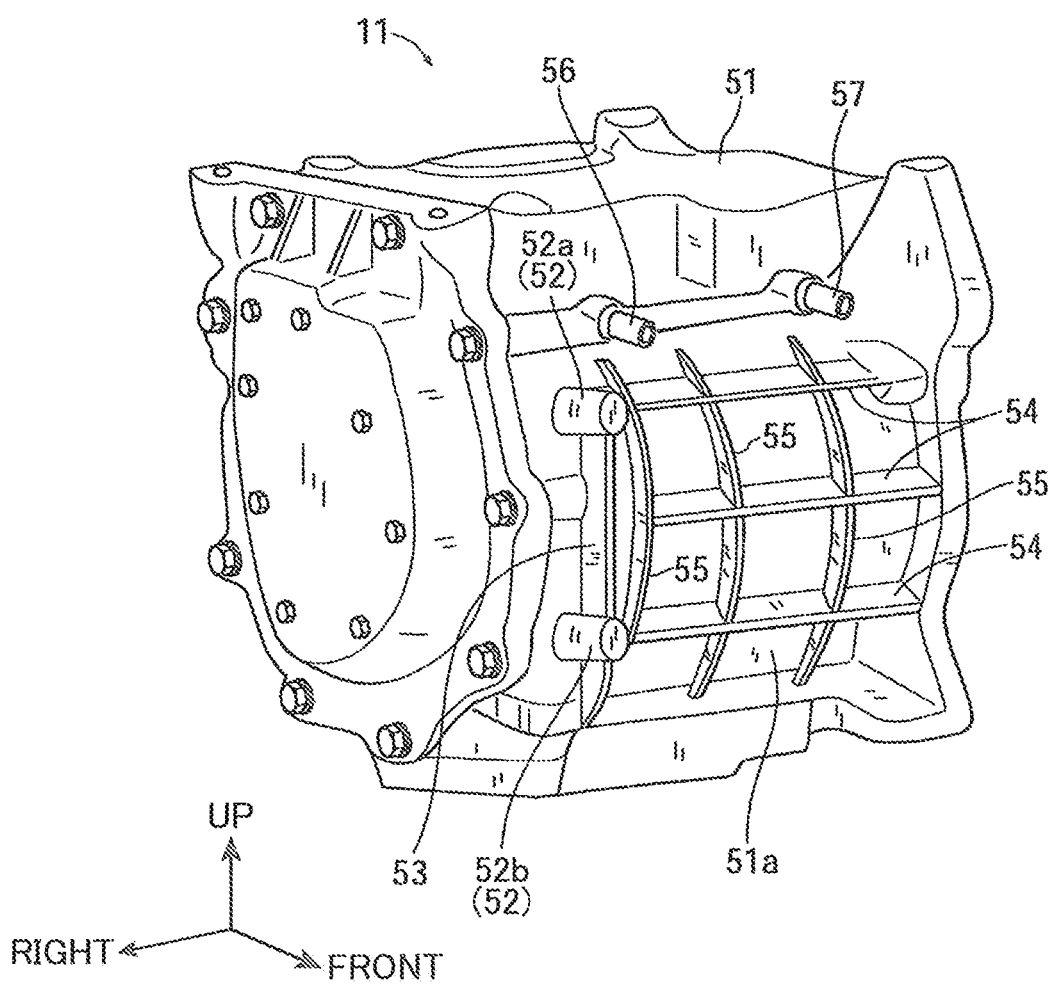
FIG. 19 is a perspective view of the motor included in the power train in FIG. 17, when viewed obliquely from the front side.

FIGS. 17 to 19 illustrate a second embodiment according to the present invention. In the present embodiment, a measure for setting a position at which a collision load is input to a power train PT to a position away from a mounting member 22 as much as possible is provided in order to more securely acquire movement of the power train PT such that the power train PT retracts, while performing yaw motion in the event of collision from the front side.

In FIGS. 17 to 19, an element indicated by the reference numeral 51 is a casing as a strengthening member constituting an outer shell of the motor 11. Further, an element indicated by the reference numeral 61 is a casing as a strengthening member constituting an outer shell of the transaxle 12. In FIG. 18, a boundary between the casings 51 and 61 is indicated by the reference sign β.

In association with that a driving axis of the motor 11 extends in the left-right direction (in the vehicle width direction), a front surface 51a of the casing 51 of the motor 11 is formed to have a substantially arc shape projecting forwardly in a side view (particularly, see FIG. 19). Specifically, the front surface 51a is formed in such a way that an amount of forward projection is the largest at an intermediate portion of the front surface 51a in the up-down direction, and the amount of forward projection decreases toward an upper or lower end of the front surface 51a.

The front surface 51a of the casing 51 includes a load receiving portion 52 for receiving a collision load from the front side. As illustrated in FIG. 19, the load receiving portion 52 includes a plurality of (in this example, two) projections 52a and 52b, each of which projects forwardly from the front surface 51a of the casing 51. The projections 52a and 52b are disposed away from each other in the up-down direction.

The load receiving portion 52 (the projections 52a and 52b) is formed on a right end of the casing 51, in other words, at a position away from the mounting member 22 as much as possible. Therefore, when a collision load is input from the front side to the load receiving portion 52, moment for turning the power train PT rearwardly (moment for generating yaw motion) around the mounting member 22 (the displacement starting point α1) is maximized.

The plurality of projections 52a and 52b constituting the load receiving portion 52 are respectively formed into a substantially pillar shape, and have a strength (rigidity) sufficient for rigidly resisting against a collision load from the front side. In the present embodiment, the projections 52a and 52b are formed integrally with the casing 51. For example, when the casing 51 is a cast product made of aluminum alloy, the projections 52a and 52b are simultaneously formed when the casing 51 is cast.

A reinforcement rib 53 extending in the up-down direction and connecting the projections 52a and 52b is formed on the front surface 51a of the casing 51. Further, a plurality of horizontal reinforcement ribs 54 and a plurality of vertical reinforcement ribs 55 are formed on the front surface 51a of the casing 51. The reinforcement ribs 53 to 55 are integrally formed with the casing 51.

The horizontal reinforcement ribs 54 extend by a certain length in a horizontal direction (in the left-right direction), and are away from one another in the up-down direction. Among the horizontal reinforcement ribs 54, two reinforcement ribs 54, namely, the uppermost reinforcement rib 54 and the lowermost reinforcement rib 54 continue to the projections 52a and 52b.

The vertical reinforcement ribs 55 extend in an arc-shape in the up-down direction, and are away from one another in a horizontal direction (in the left-right direction). The vertical reinforcement ribs 55 are formed to connect the plurality of horizontal reinforcement ribs 54 one another.

The reinforcement ribs 53 to 55 sufficiently reinforce the front surface 51a of the casing 51. Therefore, even when a collision load is input to the casing 51 of the motor 11 in the event of collision from the front side, there is no likelihood that the casing 51 is broken by the input load. Particularly, in the present embodiment, the load receiving portion 52 is reinforced by the reinforcement rib 53 and the horizontal reinforcement ribs 54 continuing to the load receiving portion 52. In the event of collision from the front side, a collision load is received by the load receiving portion 52. The reinforced load receiving portion 52 is able to securely receive a collision load without causing crush and deformation by the collision load.

A pair of connection pipes 56 and 57 constituted of a separate member are connected to an upper portion of the front surface 51a of the casing 51. The connection pipes 56 and 57 are configured to supply and discharge cooling water flowing through the casing 51.

As illustrated in FIGS. 17 and 18, a front end of the load receiving portion 52 (the projections 52a and 52b) is located on the front side with respect to the other portions of the front surface 51a of the casing 51, and a front surface of the casing 61 of the transaxle 12. In other words, a front end of the load receiving portion 52 is a portion located forwardmost among the elements of the power train PT.

In the second embodiment having the above configuration, in a case that vehicular collision from the front side occurs, and a vehicle body member (e.g. a bumper reinforcement member) disposed in front of the power train PT retracts accompanied by the collision, the vehicle body member collides with the load receiving portion 52 at an early stage (first). Since the load receiving portion 52 is located on a right end of the power train PT (the motor 11), receiving a collision load at an early stage by the load receiving portion 52 causes moment for turning the power train PT rearwardly around the vicinity of the displacement starting point α1 of the mounting member 22. Specifically, the presence of the load receiving portion 52 more securely evokes movement of the power train PT such that the power train PT retracts, while performing yaw motion. The number of the projections 52a and 52b constituting the load receiving portion 52 is not limited to two, and three or more projections may be available.

Figure 20:
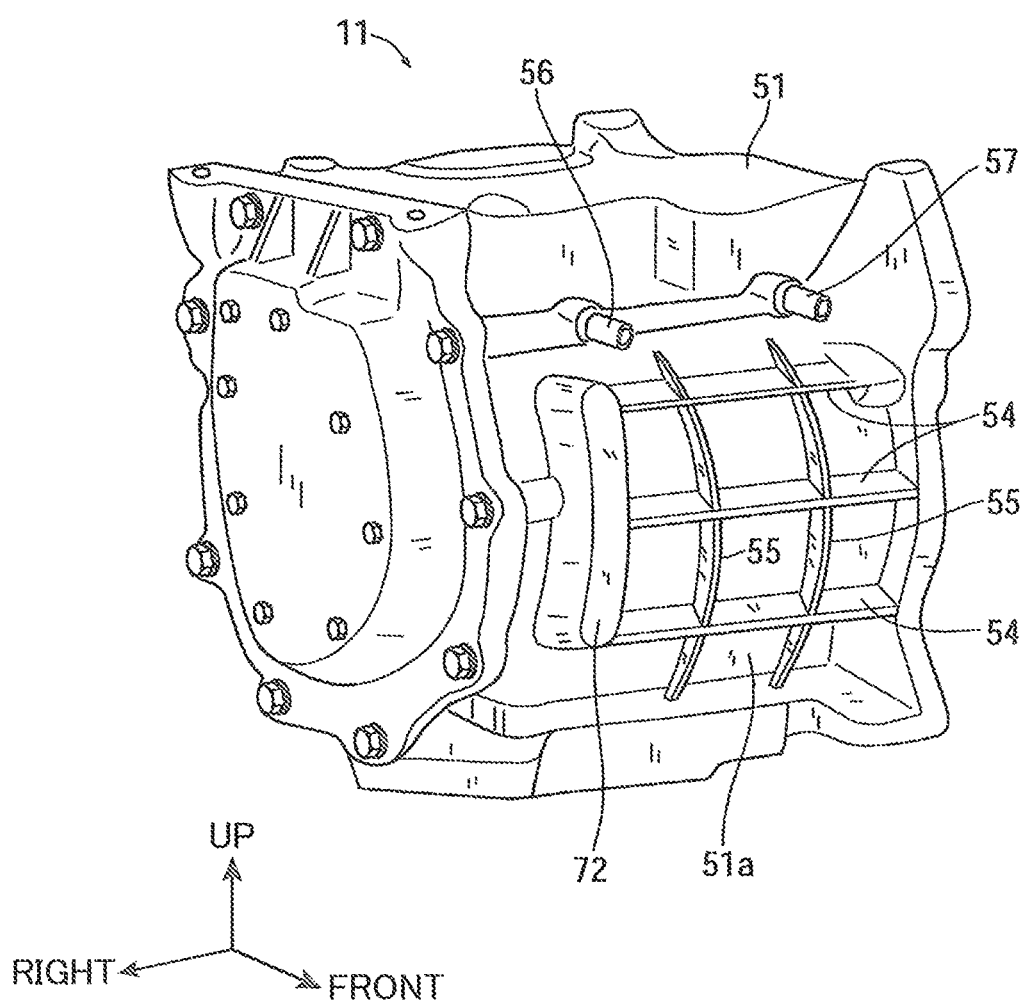
FIG. 20 illustrates a modification of the second embodiment, and is a diagram corresponding to FIG. 19.

FIG. 20 illustrates a modification in which the shape of the load receiving portion is modified, and is a diagram corresponding to FIG. 19. In the modification, a load receiving portion 72 has a shape extending in the up-down direction by a certain length. The load receiving portion 72 is integrally formed with a casing 51. Alternatively, the load receiving portion 72 may be a member independently of the casing 51, and may be mounted on a front surface 51a of the casing 51 afterwards. Further, the load receiving portion 72 may have a solid structure or a hollow structure.

In the foregoing, preferred embodiments according to the present invention have been described. The present invention, however, is not limited to these embodiments, and may be modified as necessary within the scope of the claims. For example, a direction in which the power train PT is offset with respect to the vehicle width center may be a side (a left side) opposite to the side in the embodiments. The number of the fastening bolts 40 for connecting the power train PT and the mounting bracket 30 is not specifically limited, as far as the number is plural.

In the embodiments, the positioning pins 12e and 12f are mounted on the power train PT, and the positioning holes 32e and 32f are formed in the mounting bracket 30, whereby the power train PT and the mounting bracket 30 are positioned to each other. Conversely, positioning may be performed by mounting a positioning pin on the mounting bracket 30, and forming a positioning hole in the power train PT.

In the embodiments, the viewing hole 31c is formed exclusively for the first fixing portion 32a. A viewing hole may be formed in association with a fixing portion, which is not easy to be viewed from above the mounting bracket 30, among the first to fourth fixing portions 32a to 32d, and a plurality of viewing holes associated with a plurality of fixing portions may be formed.

The embodiments describe an example in which the present invention is applied to a vehicle employing a power train PT without an engine (in which only a motor is provided as a power source), in other words, an authentic electric vehicle. However, the present invention is also applicable to a vehicle employing a power train including an engine. A vehicle in this case may be a vehicle in which only an engine is provided as a power source, or a vehicle in which both of an engine and a motor are provided as power sources. Further, a configuration of connecting respective units constituting a power train may be modified as necessary.

The present invention implicitly includes providing a method for manufacturing automobiles in which an electric vehicle without an engine, and a range extender electric vehicle including an engine dedicatedly used for power generation are individually manufactured, while sharing a vehicle body. It is needless to say that an object of the present invention implicitly includes providing configurations expressed as substantially preferred or advantageous effects, not to mention explicitly expressed configurations.

Overview of Embodiments

The following is an overview of the embodiments.

A power train support structure according to the embodiments is a structure for supporting a power train disposed to be offset to one of left and right sides within an accommodation room formed in a vehicle front portion. The support structure includes: a first front side frame disposed on one of left and right sides of the power train; a second front side frame disposed on the other of the left and right sides of the power train, the second front side frame being greatly away from the power train with respect to the first front side frame; a mounting bracket extending in a left-right direction between the second front side frame and the power train, one of left and right ends of the mounting bracket being connected to the power train; and a connecting member for connecting the other of the left and right ends of the mounting bracket and the second front side frame. The mounting bracket includes a front fixing portion to be fixed to the power train, and a rear fixing portion to be fixed to the power train on a rear side with respect to the front fixing portion. When a collision load from a front side acts on the power train, a strength of each of the front fixing portion and the rear fixing portion is set to such a strength that the rear fixing portion is broken by the collision load and the front fixing portion is not broken in such a way that the power train in a plan view retracts, while performing yaw motion substantially around a predetermined portion of the connecting member.

In the above configuration, the power train retracts, while performing yaw motion toward the vehicle width center in the event of collision from the front side. Since the above configuration enables to guide the power train to a position between the driver seat and the passenger seat, it is possible to protect a passenger seated on the driver seat or the passenger seat. Further, since the rear fixing portion is broken, it is possible to actively guide at least a rear portion of the power train downwardly. This is more advantageous in protecting the passenger.

The collision load from the front side may be a collision load acting on the power train obliquely from a front side and one of left and right sides.

When a collision load is input obliquely from the front side and one of left and right sides, in other words, in the event of oblique collision of the vehicle, it is highly likely that the power train may retract by receiving the collision load. The above configuration enables to securely protect the passenger in the event of such oblique collision.

Preferably, the vehicle may further include a floor panel for defining a bottom surface of a passenger compartment, a dashboard panel for separating the accommodation room and the passenger compartment, and a tunnel portion formed on the floor panel and bulging upwardly. An opening portion opened in an intermediate portion of a lower end of the dashboard panel in the left-right direction may be formed in a front end of the tunnel portion. In this configuration, the mounting bracket may further include a lower fixing portion to be fixed to the power train on a lower side with respect to the front fixing portion. When the collision load obliquely from the front side acts on the power train, a strength of the lower fixing portion may be set to such a strength that the lower fixing portion is broken by the collision load in such a way that the power train retracts toward the opening portion of the tunnel portion.

In the above configuration, it is possible to actively guide the power train downwardly in the event of collision from the front side. Further, it is possible to move the power train into the tunnel portion located between the driver seat and the passenger seat. This enables to more securely protect the passenger.

The power train may include a motor, and an inverter connected to an upper surface of the motor.

In the above configuration, it is possible to protect the passenger by guiding the inverter located at a relatively high position into the tunnel portion located between the driver seat and the passenger seat.

Preferably, the mounting bracket may be disposed to incline in such a way that a height of the mounting bracket decreases toward the power train.

In the above configuration, it is possible to enhance an operation of guiding the power train downwardly, while suppressing an operation of the mounting bracket hindering a displacement in the left-right direction in the event of collision from the front side. This enables to more securely protect the passenger.

Preferably, the mounting bracket may include a reinforcement rib for reinforcing the front fixing portion in such a way that a strength of the front fixing portion increases, as compared with the other fixing portions.

In the above configuration, by a simplified method in which the reinforcement rib is formed on the mounting bracket, it is possible to set the strength of the front fixing portion to such a strength that the front fixing portion is not broken in the event of collision from the front side.

Preferably, a load receiving portion for receiving the collision load may be formed on one of left and right ends of a front surface of the power train.

In this way, in a configuration that a collision load from the front side is received by the load receiving portion located far from the mounting bracket, it is possible to control movement of the power train in such a way that the power train retracts, while performing yaw motion in the event of collision from the front side. Further, forming the load receiving portion is preferable also in terms of reinforcing the power train.

Preferably, the load receiving portion may be formed to project forwardly from the front surface of the power train.

In the above configuration, it is possible to securely receive a collision load from the front side by the forwardly projecting load receiving portion.

Preferably, the load receiving portion may include a plurality of projections disposed away from each other in an up-down direction.

A collision load from the front side is input when a vehicle body member located on the front side with respect to the power train retracts, and collides with the power train. In this case, it is presumed that a position at which the vehicle body member collides with the power train varies in the up-down direction. However, in the above configuration, since a plurality of projections away from each other in the up-down direction are formed as the load receiving portion, even if the collision position varies in the up-down direction, it is possible to receive the collision load by one of the projections.

Preferably, a reinforcement rib continuing to the load receiving portion may be formed on the front surface of the power train.

In the above configuration, the reinforcement rib enables to reinforce not only the power train but also the load receiving portion. Therefore, in the event of collision from the front side, it is possible to securely receive the load from the front side by the reinforced load receiving portion. This enables to effectively use the load input to the load receiving portion, as a force of generating yaw motion of the power train.

Preferably, the power train may include, in an area including one of left and right ends of the power train, a motor for driving a wheel, and the load receiving portion may be integrally formed with a casing constituting an outer shell of the motor.

In the above configuration, it is possible to effectively use a part of the casing of the motor, as the load receiving portion.

Preferably, the casing may be formed in such a way that a front end of the load receiving portion is located forwardmost.

In the above configuration, it is possible to securely input the collision load from the front side to the loading receiving portion before the collision load is input to the other portions of the casing of the motor.

Preferably, the power train may be formed in such a way that a front end of the load receiving portion is located forwardmost.

In the above configuration, it is possible to securely input the collision load from the front side to the loading receiving portion before the collision load is input to the other portions of the power train.

INDUSTRIAL APPLICABILITY

The present invention is preferable as a safety measure against collision in a case that a power train is disposed to be offset to one of left and right sides.

This application is based on Japanese Patent application No. 2019-100932 filed in Japan Patent Office on May 30, 2019 and Japanese Patent application No. 2019-141908 filed in Japan Patent Office on Aug. 1, 2019, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A power train support structure for a vehicle, the structure being configured to support a power train disposed to be offset to one of left and right sides within an accommodation room formed in a vehicle front portion, comprising:

a first front side frame disposed on one of left and right sides of the power train;

a second front side frame disposed on the other of the left and right sides of the power train, the second front side frame being greatly away from the power train with respect to the first front side frame;

a mounting bracket extending in a left-right direction between the second front side frame and the power train, one of left and right ends of the mounting bracket being connected to the power train; and a connecting member for connecting the other of the left and right ends of the mounting bracket and the second front side frame, wherein the mounting bracket includes a front fixing portion to be fixed to the power train, and a rear fixing portion to be fixed to the power train on a rear side with respect to the front fixing portion, when a collision load from a front side acts on the power train, a strength of each of the front fixing portion and the rear fixing portion is set to such a strength that the rear fixing portion is broken by the collision load and the front fixing portion is not broken in such a way that the power train in a plan view retracts, while performing yaw motion substantially around a predetermined portion of the connecting member, the collision load from the front side is a collision load acting on the power train obliquely from the front side and one of left and right sides, the vehicle further includes a floor panel for defining a bottom surface of a passenger compartment, a dashboard panel for separating the accommodation room and the passenger compartment, and a tunnel portion formed on the floor panel and bulging upwardly, an opening portion opened in an intermediate portion of a lower end of the dashboard panel in the left-right direction is formed in a front end of the tunnel portion, the mounting bracket further includes a lower fixing portion to be fixed to the power train on a lower side with respect to the front fixing portion, when the collision load obliquely from the front side acts on the power train, a strength of the lower fixing portion is set to such a strength that the lower fixing portion is broken by the collision load in such a way that the power train retracts toward the opening portion of the tunnel portion, and the mounting bracket includes a reinforcement rib for reinforcing the front fixing portion in such a way that a strength of the front fixing portion increases, as compared with the other fixing portions.

2. The power train support structure according to claim 1, wherein
the power train includes a motor, and an inverter connected to an upper surface of the motor.

3. The power train support structure according to claim 1, wherein
the mounting bracket is disposed to incline in such a way that a height of the mounting bracket decreases toward the power train.

4. The power train support structure according to claim 1, wherein
a load receiving portion for receiving the collision load is formed on one of left and right ends of a front surface of the power train.

5. The power train support structure according to claim 4, wherein
the load receiving portion is formed to project forwardly from the front surface of the power train.

6. The power train support structure according to claim 5, wherein
the load receiving portion includes a plurality of projections disposed away from each other in an up-down direction.

7. The power train support structure according to claim 5, wherein
a reinforcement rib continuing to the load receiving portion is formed on the front surface of the power train.

8. The power train support structure according to claim 5, wherein
the power train includes, in an area including one of left and right ends of the power train, a motor for driving a wheel, and
the load receiving portion is integrally formed with a casing constituting an outer shell of the motor.

9. The power train support structure according to claim 8, wherein
the casing is formed in such a way that a front end of the load receiving portion is located forwardmost.

10. The power train support structure according to claim 5, wherein
the power train is formed in such a way that a front end of the load receiving portion is located forwardmost.

11. A power train support structure for a vehicle, the structure being configured to support a power train disposed to be offset to one of left and right sides within an accommodation room formed in a vehicle front portion, comprising:
a first front side frame disposed on one of left and right sides of the power train;
a second front side frame disposed on the other of the left and right sides of the power train, the second front side frame being greatly away from the power train with respect to the first front side frame;
a mounting bracket extending in a left-right direction between the second front side frame and the power train, one of left and right ends of the mounting bracket being connected to the power train; and
a connecting member for connecting the other of the left and right ends of the mounting bracket and the second front side frame, wherein
the mounting bracket includes a front fixing portion to be fixed to the power train by a fastening bolt, and a rear fixing portion to be fixed to the power train by a fastening bolt on a rear side with respect to the front fixing portion,
a thickness of a vicinity of the front fixing portion of the mounting bracket increases, or a reinforcement rib is formed on the mounting bracket in such a way that a strength of a vicinity of the front fixing portion increases, whereby a strength of the front fixing portion is set higher than a strength of the rear fixing portion,
the vehicle further includes a floor panel for defining a bottom surface of a passenger compartment, a dashboard panel for separating the accommodation room and the passenger compartment, and a tunnel portion formed on the floor panel and bulging upwardly,
an opening portion opened in an intermediate portion of a lower end of the dashboard panel in the left-right direction is formed in a front end of the tunnel portion,
the mounting bracket further includes a lower fixing portion to be fixed to the power train on a lower side with respect to the front fixing portion, and
when a collision load from a front side acts obliquely on the power train from the front side and one of left and right sides, a strength of the lower fixing portion is set to such a strength that the lower fixing portion is broken by the collision load such that the power train retracts toward the opening portion of the tunnel portion.

* * * * *